US012681723B2

(12) United States Patent
Janakiraman et al.

(10) Patent No.: US 12,681,723 B2
(45) Date of Patent: Jul. 14, 2026

(54) SOFTWARE DEVELOPMENT PLANNING USING MACHINE LEARNING

(71) Applicant: Dell Products L.P., Round Rock, TX (US)

(72) Inventors: Tamilarasan Janakiraman, Rochestown (IE); Kishore Gowrav Ramesh Babu, Mysore (IN); Prantar Bora, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 270 days.

(21) Appl. No.: 18/648,931

(22) Filed: Apr. 29, 2024

(65) Prior Publication Data

US 2025/0335193 A1     Oct. 30, 2025

(51) Int. Cl.
*G06F 8/77* (2018.01)
*G06N 20/00* (2019.01)

(52) U.S. Cl.
CPC .............. *G06F 8/77* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,719,736 | B1 * | 7/2020 | Mehta | G06N 20/00 |
| 2021/0117853 | A1 * | 4/2021 | Lynch | G06N 5/02 |
| 2021/0326736 | A1 * | 10/2021 | Kishimoto | G06F 18/285 |
| 2022/0092464 | A1 * | 3/2022 | Wistuba | G06F 21/554 |
| 2022/0327058 | A1 * | 10/2022 | Vu | G06F 12/0871 |
| 2023/0059609 | A1 * | 2/2023 | Ishikawa | G06Q 10/06 |
| 2023/0100142 | A1 * | 3/2023 | Karimibiuki | G06F 16/2468 726/25 |
| 2023/0316172 | A1 * | 10/2023 | Ayat | G06F 40/20 705/7.13 |
| 2024/0104429 | A1 * | 3/2024 | Datt | G06F 11/3495 |
| 2024/0184566 | A1 * | 6/2024 | Gabel | G06F 8/70 |
| 2024/0329949 | A1 * | 10/2024 | Chen | G06F 8/427 |

(Continued)

OTHER PUBLICATIONS

Wikipedia, "Jira (software)," https://en.wikipedia.org/w/index.php?title=Jira_(software)&oldid=1215859843, Mar. 27, 2024, 4 pages.

(Continued)

*Primary Examiner* — Toan H Vu
(74) *Attorney, Agent, or Firm* — Ryan, Mason & Lewis, LLP

(57) ABSTRACT

A method includes inputting first data including a plurality of features for software development to a first machine learning model, wherein the first machine learning model generates one or more descriptions of a software development project based at least in part on the first data, and inputting second data based at least in part on the one or more descriptions of the software development project to a second machine learning model, wherein the second machine learning model generates one or more assignments to one or more developers to perform one or more tasks for the software development project. The method further includes causing sending of the one or more assignments to a software development project platform to enable implementation of the one or more assignments.

20 Claims, 39 Drawing Sheets

(56) References Cited

U.S. PATENT DOCUMENTS

2024/0346403 A1* 10/2024 Singla ............ G06Q 10/063114
2025/0348566 A1* 11/2025 Xu ........................ G06F 21/552

OTHER PUBLICATIONS

Github, "About Webhooks," https://docs.github.com/en/webhooks/about-webhooks, Accessed Apr. 19, 2024, 3 pages.
P. Srivatsavaya, "Advantages and Disadvantages of pad_sequences—keras layer," https://medium.com/@prudhviraju.srivatsavaya/advantages-and-disadvantages-of-pad-sequences-keras-layer-4ea08a7eee5c#:%7E:text=pad_sequence%E2%80%A6, Aug. 31, 2023, 7 pages.
J. Short, "How to Create a Jira Ticketing System," https://www.helpscout.com/blog/jira-ticketing-system/#:~:text=Jira%20Software%20is%20a%20project,face%20in%20the%20development%20process., Sep. 21, 2023, 11 pages.
K. V., "Introduction to FastText Embeddings and its Implication," https://www.analyticsvidhya.com/blog/2023/01/introduction-to-fasttext-embeddings-and-its-implication/#:~:text=FastText, Apr. 25, 2024, 10 pages.
U.S. Appl. No. 18/644,573 filed in the name of Tamilarasan Janakiraman et al. on Apr. 24, 2024, and entitled "Code Quality Management Using Machine Learning."

* cited by examiner

```
from keras.preprocessing.text import Tokenizer
from keras.utils import pad_sequences
from tensorflow.keras import optimizers
from keras.models import Sequential, load_model
from keras.layers import Dense, Embedding, GRU, LSTM, Bidirectional
from keras.layers import Conv1D, MaxPooling1D, GlobalMaxPooling1D
from keras.layers import Activation, Dropout, Flatten
from keras.layers import Embedding
from keras.initializers import Constant
from keras.callbacks import ModelCheckpoint, EarlyStopping
from keras.preprocessing import sequence
from keras.preprocessing.text import Tokenizer
from keras.models import load_model
from keras import backend as K
from keras import regularizers from nltk.stem import WordNetLemmatizer
from nltk.corpus import stopwords
from nltk.tokenize import RegexpTokenizer, word_tokenize from sklearn import metrics
from sklearn.model_selection import train_test_split from tqdm import tqdm
from subprocess import check_output
from collections import Counter
from wordcloud import WordCloud, ImageColorGenerator
```

```
import keras
import spacy
import string
import nltk
nltk.download('punkt')
nltk.download('stopwords')

import tensorflow as tf
import numpy as np
import pandas as pd
import matplotlib.pyplot as plt
import seaborn as sns import os, re, os, csv, math, codecs
import time import pickle

[nltk_data] Downloading package punkt to /root/nltk_data...
[nltk_data]   Unzipping tokenizers/punkt.zip.
[nltk_data] Downloading package stopwords to /root/nltk_data...
[nltk_data]   Unzipping corpora/stopwords.zip.
```

```
path to file = '/content/drive/MyDrive/Colab
Notebooks/filter_data_ddrp.csv"

df1 = pd.read_csv('/content/drive/MyDrive/Colab
Notebooks/filter_data_ddrp.csv')
```

```
df1.tail()

summary
168                 Test changes on ingress for each PG
169     Debug of APEX Test Cases Running via Atlas/CT ...
170         Increase Number of Retries on Kafka Broker
171    DRP team Auto-Triage - Make DRP repo 100% comp...
172     add a prometheus app to monitor nfs mount on h...

description
label
168    *Summary: As a TechOps Developer, I want to te...
Marceline Friedman
169    Continuation of the work from last sprint runn...
Stacey_Strand
170    Extend the number of attempts to connect to Ka...
Stacey Strand
171    DRP Auto-Triage team - Make DRP repo 100% comp...
speerd
172    We'd like to add one prometheus app to monitor...
speerd
```

800

```
df1['text'] = df1['summary']
df1['target'] = df1['label']
df2 = df1[['text', 'target']]
df2.tail()
```

| | text |
|---|---|
| target | |
| 168 | Test changes on ingress for each PG |
| Marceline_Friedman | |
| 169 | Debug of APEX Test Cases Running via Atlas/CT ... |
| Stacey_Strand | |
| 170 | Increase Number of Retries on Kafka Broker |
| Stacey_Strand | |
| 171 | DRP team Auto-Triage - Make DRP repo 100% comp... |
| speerd | |
| 172 | add a prometheus app to monitor nfs mount on h... |
| speerd | |

```
df2[df2.target == 'speard'].target = 0
df2[df2.target == 'Stacey Strand'].target = 1
df2[df2.target == 'Marceline_Friedman'].target = 2
df2.tail()
```

|     | text | target |
| --- | --- | --- |
| 168 | Test changes on ingress for each PG | 2 |
| 169 | Debug of APEX Test Cases Running via Atlas/CT ... | 1 |
| 170 | Increase Number of Retries on Kafka Broker | 1 |
| 171 | DRP team Auto-Triage - Make DRP repo 100% comp... | 0 |
| 172 | add a prometheus app to monitor nfs mount on h... | 0 |

```python
def clean_text(text):
    text = text.lower()
    pattern = re.compile('http[s]?://(?:[a-zA-Z]|[0-9]|[$-_@.&+])|[!*\(\),])+')
    text = pattern.sub(' ', text)
    text = ' '.join(filter(lambda x:x[0]!='@', text.split()))
    emoji = re.compile("["
        u"\U0001F600-\U0001F64F"  # emoticons
        u"\U0001F300-\U0001F5FF"  # symbols & pictographs
        u"\U0001F680-\U0001F6FF"  # transport & map
        u"\U0001F1E0-\U0001F1FF"  # flags (iOS)
        u"\U00002702-\U000027B0"
        u"\U000024C2-\U0001F251"
        "]+", flags=re.UNICODE)
    text = emoji.sub(r'', text)
```

Figure 10B:
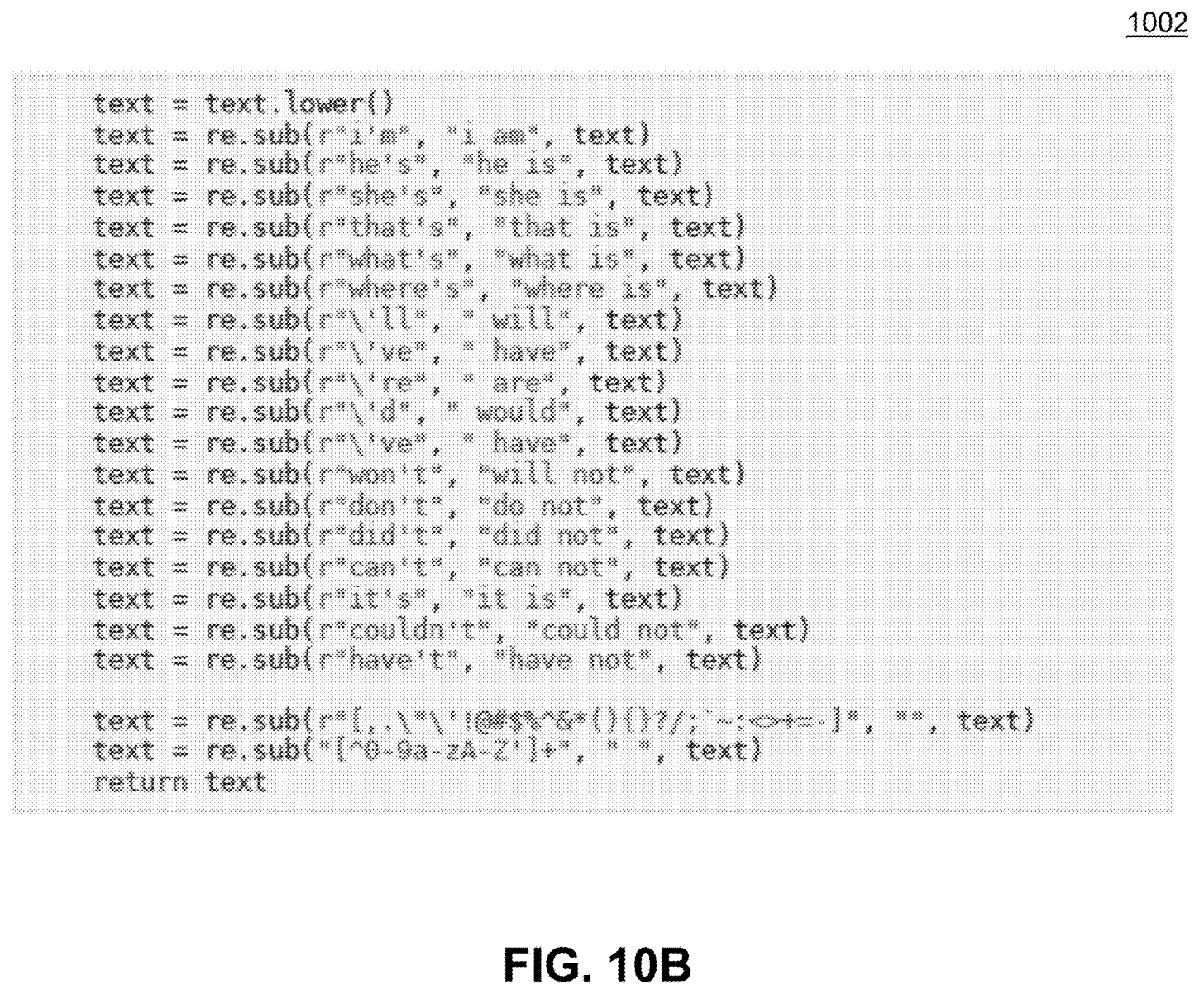

```
text = text.lower()
text = re.sub(r"i\'m", "i am", text)
text = re.sub(r"he\'s", "he is", text)
text = re.sub(r"she\'s", "she is", text)
text = re.sub(r"that\'s", "that is", text)
text = re.sub(r"what\'s", "what is", text)
text = re.sub(r"where\'s", "where is", text)
text = re.sub(r"\'ll", "will", text)
text = re.sub(r"\'ve", "have", text)
text = re.sub(r"\'re", "are", text)
text = re.sub(r"\'d", "would", text)
text = re.sub(r"\'ve", "have", text)
text = re.sub(r"won\'t", "will not", text)
text = re.sub(r"don\'t", "do not", text)
text = re.sub(r"did\'t", "did not", text)
text = re.sub(r"can\'t", "can not", text)
text = re.sub(r"it\'s", "it is", text)
text = re.sub(r"couldn\'t", "could not", text)
text = re.sub(r"have\'t", "have not", text)

text = re.sub(r"[-()\"#/@;:<>{}+=~|.?,]", "", text)
text = re.sub(r"[^0-9a-zA-z]+", " ", text)
return text
```

Figures 11, 12, 13:
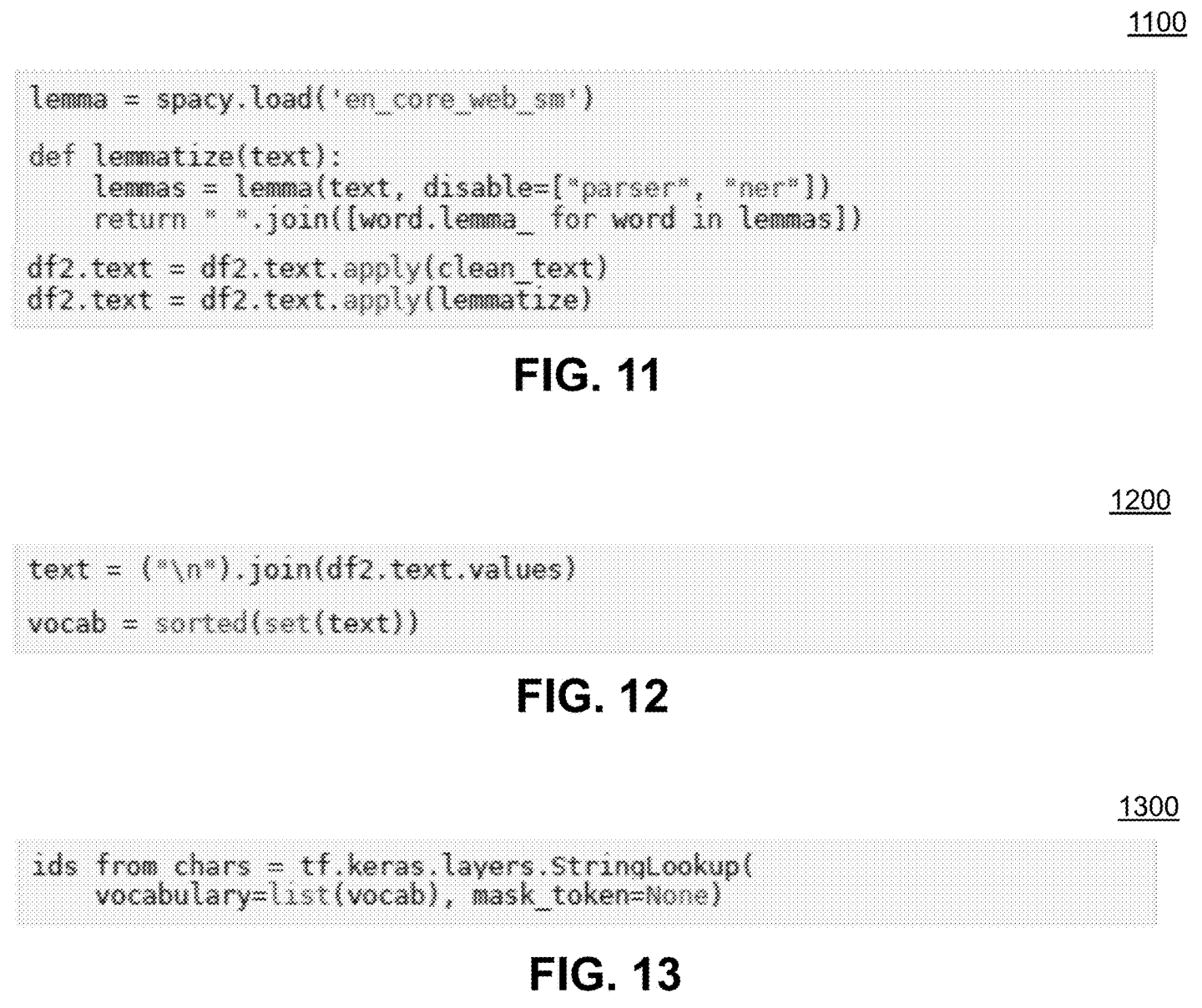

```
lemma = spacy.load('en_core_web_sm')

def lemmatize(text):
    lemmas = lemma(text, disable=["parser", "ner"])
    return " ".join([word.lemma_ for word in lemmas])

df2.text = df2.text.apply(clean_text)
df2.text = df2.text.apply(lemmatize)
```

```
text = ("\n").join(df2.text.values)
vocab = sorted(set(text))
```

```
ids_from_chars = tf.keras.layers.StringLookup(
    vocabulary=list(vocab), mask_token=None)
```

Figures 14, 15:
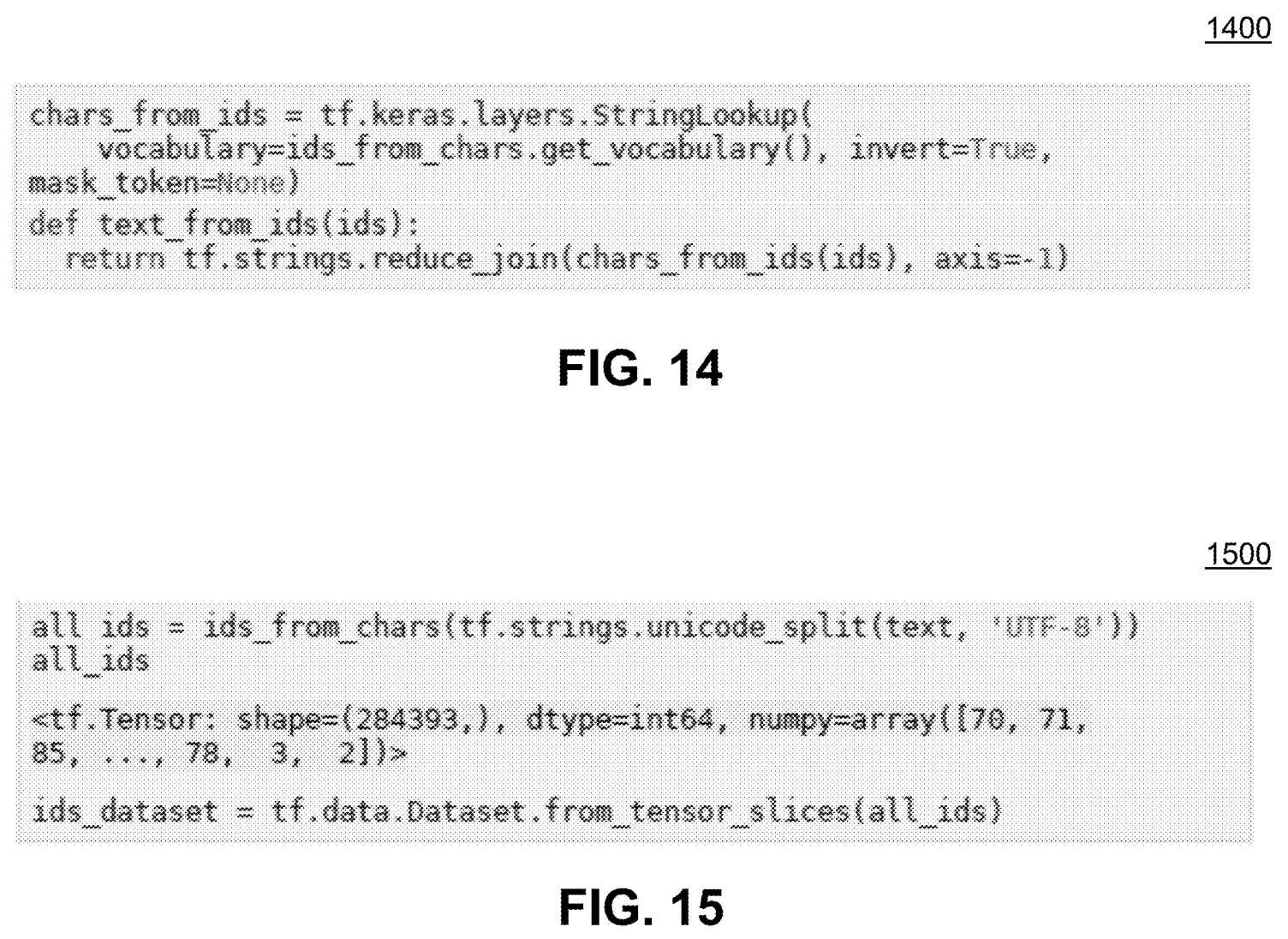

```
chars_from_ids = tf.keras.layers.StringLookup(
    vocabulary=ids_from_chars.get_vocabulary(), invert=True,
mask_token=None)
def text_from_ids(ids):
    return tf.strings.reduce_join(chars_from_ids(ids), axis=-1)
```

```
all_ids = ids_from_chars(tf.strings.unicode_split(text, 'UTF-8'))
all_ids
<tf.Tensor: shape=(284393,), dtype=int64, numpy=array([70, 71,
85, ..., 78,  3,  2])>
ids_dataset = tf.data.Dataset.from_tensor_slices(all_ids)
```

Figure 16:
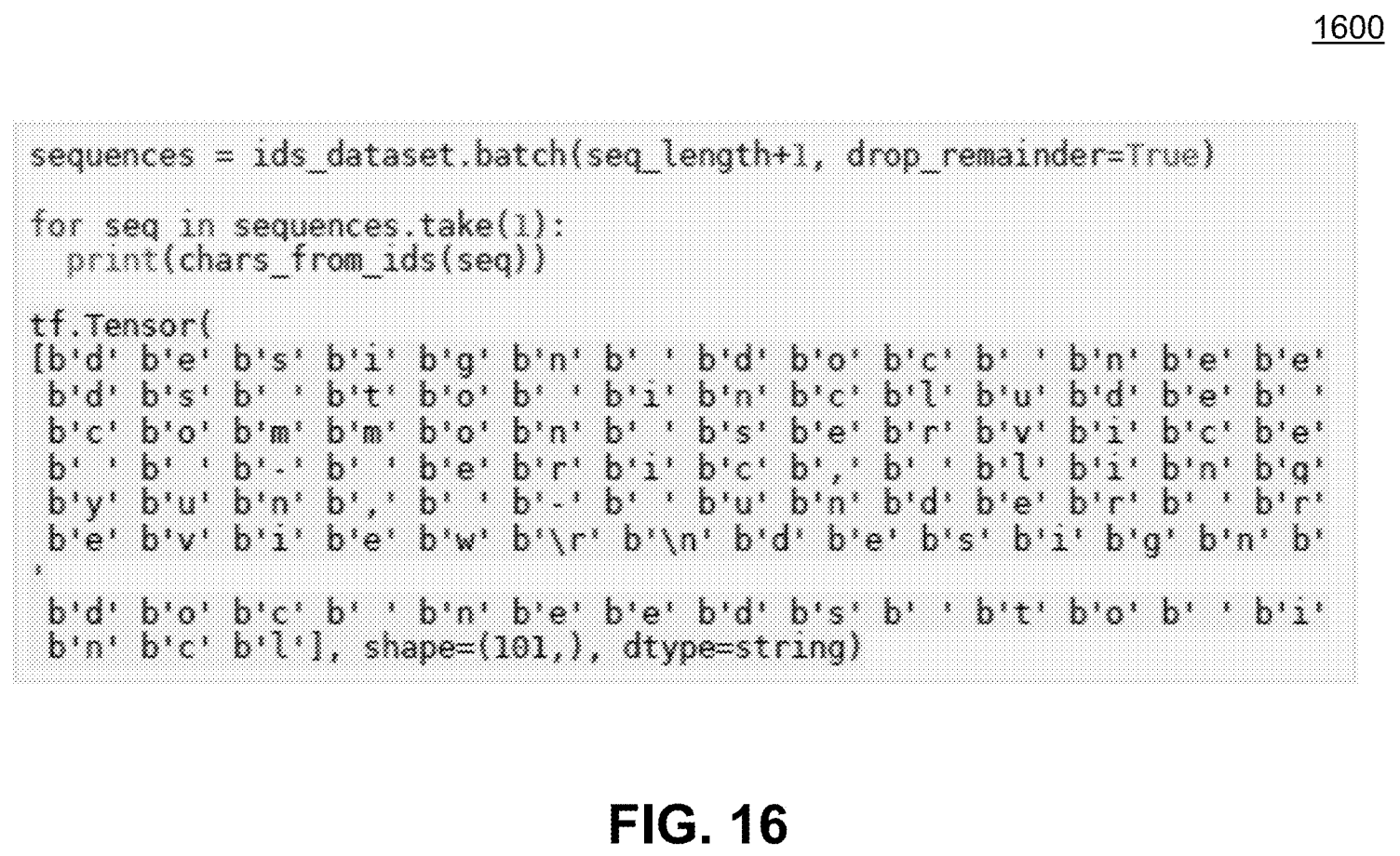

```
sequences = ids_dataset.batch(seq_length+1, drop_remainder=True)

for seq in sequences.take(1):
    print(chars_from_ids(seq))

tf.Tensor(
[b'd' b'e' b's' b'c' b'b' b'i' b'n' b'g' b'i' b't' b's' b'e' b'd' b'i' b't' b'o' b'r' b'i'
 b'd' b'i' b's' b'c' b'n' b't' b'i' b'o' b'd' b'e' b'c' b'b' b'i' b't' b'e' b'b' b'i' b'g'
 b'c' b'o' b'o' b'b' b'i' b't' b'y' b'r' b'i' b'b' b'e' b'b' b'i' b't' b'b' b'i' b'b'
 b'y' b'b' b'e' b'b' b'i' b'b' b'e' b'b' b'i' b'b' b'd' b'b' b'n' b'b' b'i' b'g' b'n'
 b'e' b'd' b'b' b'b' b'd' b'e' b'b' b'e' b'b' b'd' b'\n' b'b'\r' b'b'\n' b'b'\r' b'b'e' b'b's' b'b'' b''
 b'd' b'o' b'c' b'b' b'c' b'b' b'w' b'b' b'n' b'b'e' b'b'e' b'b'd' b'b's' b'b'' b'' b'b'i'
 b'n' b'c' b'b' b't' b'b'] , shape=(101,), dtype=string)
```

```
def split_input_target(sequence):
    input_text = sequence[:-1]
    target_text = sequence[1:]
    return input_text, target_text dataset = sequences.map(split_input_target)
```

```
# Batch size
BATCH_SIZE = 64

# Buffer size to shuffle the dataset
# (TF data is designed to work with possibly infinite sequences,
# so it doesn't attempt to shuffle the entire sequence in memory.
# Instead,
# it maintains a buffer in which it shuffles elements).
BUFFER_SIZE = 10000 dataset = (
    dataset
    .shuffle(BUFFER_SIZE)
    .batch(BATCH_SIZE, drop_remainder=True)
    .prefetch(tf.data.experimental.AUTOTUNE))

dataset

<_PrefetchDataset element_spec=(TensorSpec(shape=(64, 100),
dtype=tf.int64, name=None), TensorSpec(shape=(64, 100),
dtype=tf.int64, name=None))>
```

```python
# Length of the vocabulary in StringLookup Layer
vocab_size = 103

# The embedding dimension
embedding_dim = 256

# Number of RNN units
rnn_units = 1024 class MyModel(tf.keras.Model):
    def __init__(self, vocab_size, embedding_dim, rnn_units):
        super().__init__(self)
        self.embedding = tf.keras.layers.Embedding(vocab_size,
                                                   embedding_dim)
        self.gru = tf.keras.layers.GRU(rnn_units,
                                       return_sequences=True,
                                       return_state=True)
        self.dense = tf.keras.layers.Dense(vocab_size)

def call(self, inputs, states=None, return_state=False,
             training=False):
        x = inputs
        x = self.embedding(x, training=training)
        if states is None:
            states = self.gru.get_initial_state(x)
        x, states = self.gru(x, initial_state=states, training=training)
        x = self.dense(x, training=training)

if return_state:
            return x, states
        else:
            return x model = MyModel(
    vocab_size=vocab_size,
    embedding_dim=embedding_dim,
    rnn_units=rnn_units)
```

```
loss = tf.losses.SparseCategoricalCrossentropy(from_logits=True)

model.compile(optimizer='adam', loss=loss)
```

```
# Directory where the checkpoints will be saved
checkpoint_dir = './training_checkpoints'
# Name of the checkpoint files
checkpoint_prefix = os.path.join(checkpoint_dir, "ckpt_{epoch}")

checkpoint_callback = tf.keras.callbacks.ModelCheckpoint(
    filepath=checkpoint_prefix,
    save_weights_only=True)
```

```
EPOCHS = 20 history = model.fit(dataset, epochs=EPOCHS,
    callbacks=[checkpoint_callback])
```

```
from keras.models import load_model model.save('/content/drive/MyDrive/Colab
Notebooks/generate_subtask_model', save_format='tf')
```

```
class OneStep(tf.keras.Model):
    def __init__(self, model, chars_from_ids, ids_from_chars,
temperature=1.0):
        super().__init__()
        self.temperature = temperature
        self.model = model
        self.chars_from_ids = chars_from_ids
        self.ids_from_chars = ids_from_chars

# Create a mask to prevent "[UNK]" from being generated.
        skip_ids = self.ids_from_chars(['[UNK]'])[:, None]
        sparse_mask = tf.SparseTensor(
            # Put a -inf at each bad index.
            values=[-float('inf')]*len(skip_ids),
            indices=skip_ids,
            # Match the shape to the vocabulary
            dense_shape=[len(ids_from_chars.get_vocabulary())])
        self.prediction_mask = tf.sparse.to_dense(sparse_mask)

@tf.function
    def generate_one_step(self, inputs, states=None):
        # Convert strings to token IDs.
        input_chars = tf.strings.unicode_split(inputs, 'UTF-8')
        input_ids = self.ids_from_chars(input_chars).to_tensor()

# Run the model.
        # predicted_logits.shape is [batch, char, next_char_logits]
        predicted_logits, states = self.model(inputs=input_ids,
states=states,
                                              return_state=True)
        # Only use the last prediction.
        predicted_logits = predicted_logits[:, -1, :]
        predicted_logits = predicted_logits/self.temperature
        # Apply the prediction mask: prevent "[UNK]" from being generated.
        predicted_logits = predicted_logits + self.prediction_mask
```

```
# Sample the output logits to generate token IDs.
predicted_ids = tf.random.categorical(predicted_logits,
num_samples=1)
predicted_ids = tf.squeeze(predicted_ids, axis=-1)

# Convert from token ids to characters
predicted_chars = self.chars_from_ids(predicted_ids)

# Return the characters and model state.
return predicted_chars, states one_step_model = OneStep(model, chars_from_ids, ids_from_chars)

start = time.time()
states = None
next_char = tf.constant(['Investigate Grafana instance'])
result = [next_char]

for n in range(400):
    next_char, states = one_step_model.generate_one_step(next_char,
states=states)
    result.append(next_char)

result = tf.strings.join(result)
end = time.time()
index = 1
for string in result[0].numpy().decode('utf-8').split('\n'):
    if len(string) > 35:
        print(f"Sub-task{index}: ",string)
        index+=1
# print('\nRun time:', end - start)

Sub-task-1: Investigate Grafana instance log index and link
Sub-task-2: RB Creation:  afma ordersion to Rownach/PSC, workflows,
```

Figures 24C, 25, 26:
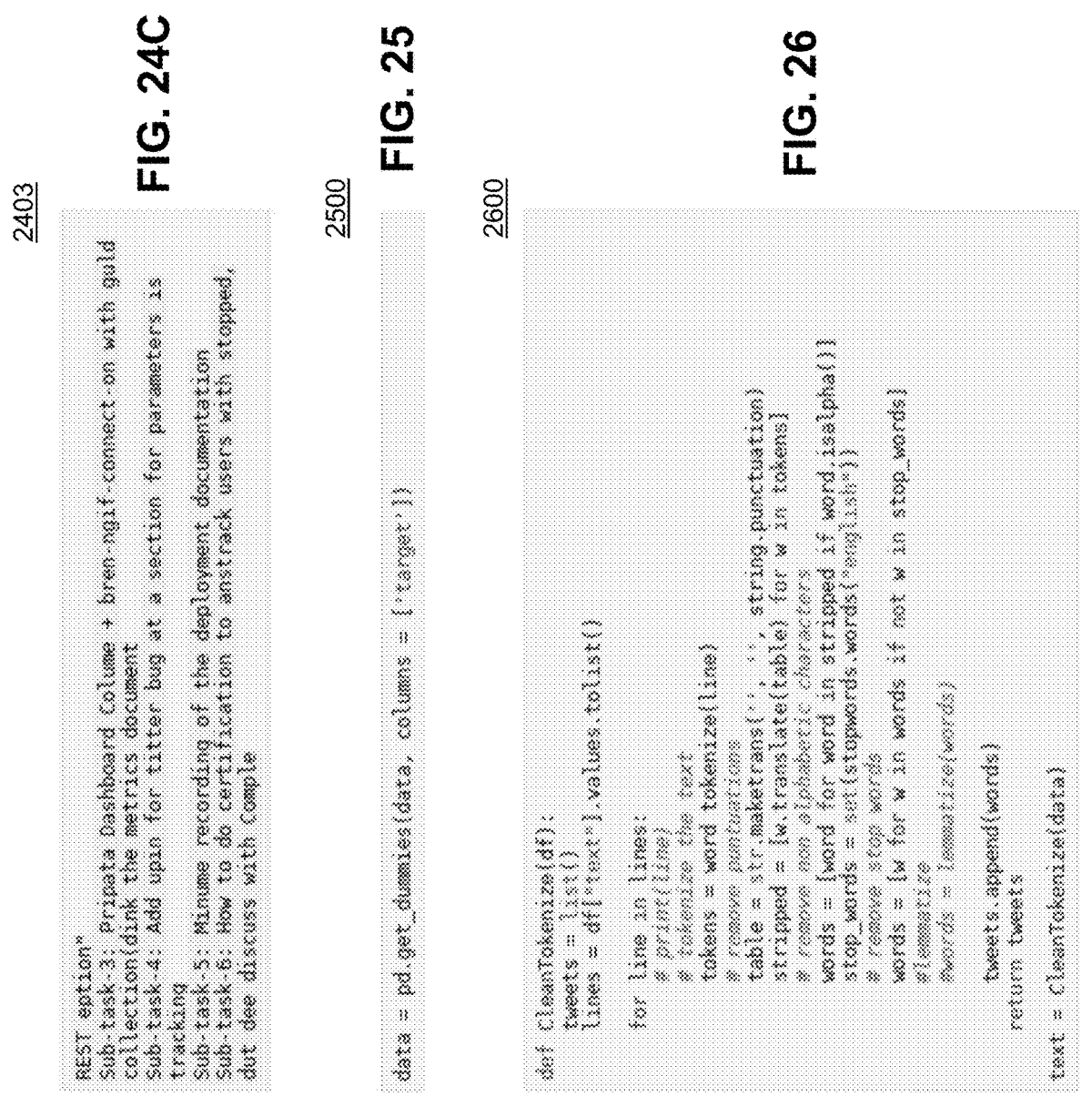

```
REST section"
sub-task-3: private Dashboard Column + bren-ngif connection with gold
collection|link the metrics document
sub-task-4: Add upon for titter bug at a section for parameters is
tracking
sub-task-5: Minime recording of the deployment documentation
sub-task-6: How to do certification to anstrack users with stopped.
dat dee discuss with Comple
```

```
data = pd.get_dummies(data, columns = ('target'))
```

```
def CleanTokenize(df):
    tweets = list()
    lines = df['text'].values.tolist()

for line in lines:
        # print(line)
        # tokenize the text
        tokens = word_tokenize(line)
        # remove punctuations
        table = str.maketrans('', '', string.punctuation)
        stripped = [w.translate(table) for w in tokens]
        # remove non alphabetic characters
        words = [word for word in stripped if word.isalpha()]
        stop_words = set(stopwords.words('english'))
        # remove stop words
        words = [w for w in words if not w in stop_words]
        #Lemmatize
        words = [lemmatize(words)

tweets.append(words)
    return tweets text = CleanTokenize(data)
```

```
validation_split = 0.2
max_length = 25 tokenizer_obj = Tokenizer()
tokenizer_obj.fit_on_texts(text)
with open('/content/drive/mydrive/colab notebooks/tokenizer.pickle',
'wb') as handle:
    pickle.dump(tokenizer_obj, handle,
protocol=pickle.HIGHEST_PROTOCOL)
sequences = tokenizer_obj.texts_to_sequences(text)

word_index = tokenizer_obj.word_index
print('unique tokens = ', len(word_index))
vocab_size = len(tokenizer_obj.word_index) + 1
print('vocab size = ', vocab_size)

lines_pad = pad_sequences(sequences, maxlen=max_length,
padding='post')
sentiment = data[['target_0', 'target_1', 'target_2']].values indices = np.arange(lines_pad.shape[0])
np.random.shuffle(indices)
lines_pad = lines_pad[indices]
sentiment = sentiment[indices]

num_validation_samples = int(validation_split * lines_pad.shape[0])

x_train_pad = lines_pad[:-num_validation_samples]
y_train = sentiment[:-num_validation_samples]
X_test_pad = lines_pad[-num_validation_samples:]
y_test = sentiment[-num_validation_samples:]

unique tokens   448
vocab size - 449 print('shape of x_train_pad', x_train_pad.shape)
print('shape of y_train', y_train.shape)

print('shape of X_test_pad', X_test_pad.shape)
print('shape of y_test', y_test.shape)

shape of x_train_pad: (139, 25)
shape of y_train: (139, 3)
shape of X_test_pad: (34, 25)
shape of y_test: (34, 3)
```

```
# pip install fasttext
import fasttext
ft = fasttext.load_model('/content/drive/MyDrive/Colab
notebooks/cc.en.300.bin')

ft.get_dimension()

Warning : `load_model` does not return WordVectorModel or
SupervisedModel any more, but a `fasttext` object which is very
similar.

300 batch_size = 23
num_epochs = 20 model parameters
num_filters = 64
embed_dim = 300
weight_decay = 1e-4

MAX_NB_WORDS = 200000
tokenizer = RegexpTokenizer(r'\w+')
stop_words = set(stopwords.words('english'))
stop_words.update(['.', ',', '"', "'", ':', ';', '(', ')', '[', ']',
'{', '}'])

print('preparing embedding matrix...')
words_not_found = []
nb_words = min(MAX_NB_WORDS, len(word_index) + 1)
embedding_matrix = np.zeros((nb_words, embed_dim))
for word, i in word_index.items():
    if i >= nb_words:
        continue
    embedding_vector = ft.get_word_vector(word)
    if (embedding_vector is not None) and len(embedding_vector) > 0:
        # words not found in embedding index will be all-zeros.
        embedding_matrix[i] = embedding_vector
    else:
        words_not_found.append(word)
```

```
print('number of null word embeddings: %d' %
np.sum(np.sum(embedding_matrix, axis=1) == 0))

preparing embedding matrix...
number of null word embeddings: 1 embedding_layer = Embedding(len(word_index) + 1,
                            embed_dim,
                            weights=[embedding_matrix],
                            input_length=max_length,
                            trainable=False)
```

```
model1 = Sequential()
model1.add(embedding_layer)
model1.add(Conv1D(16, 7, padding='same', activation='relu'))
model1.add(MaxPooling1D(pool_size=2))
model1.add(Dropout(0.3))
model1.add(LSTM(32, dropout=0.3, recurrent_dropout=0.2))
model1.add(Dense(3, activation='sigmoid'))
model1.compile(loss='binary_crossentropy', optimizer='adam',
metrics=['accuracy'])
print(model1.summary())

Model: "sequential"
_____
 Layer (type)                Output Shape              Param #
=================================================================
 embedding (Embedding)       (None, 25, 300)           134700 conv1d (Conv1D)             (None, 25, 16)            33616 max_pooling1d (MaxPooling1D  (None, 12, 16)           0
 )

dropout (Dropout)           (None, 12, 16)            0 lstm (LSTM)                 (None, 32)                6272 dense (Dense)               (None, 3)                 99

=================================================================
Total params: 174,687
Trainable params: 39,987
Non-trainable params: 134,700
_____
None
tf.keras.utils.plot_model(model1,
                          to_file='model1.png',
                          show_shapes=True,
                          show_dtype=True,
                          show_layer_names=True,
                          rankdir='TB',
                          expand_nested=True,
                          dpi=96,
                          show_layer_activations=True)
```

```
history = model1.fit(X_train_pad, y_train,
            batch_size=batch_size,
            epochs=num_epochs,
            validation_data=(X_test_pad, y_test),
            verbose=2)

Epoch 1/20
7/7 [==============================] - 5s 107ms/step - loss: 0.6800 - accuracy: 0.3741 - val_loss: 0.6852 - val_accuracy: 0.2647
Epoch 2/20
7/7 [==============================] - 0s 37ms/step - loss: 0.6789 - accuracy: 0.4676 - val_loss: 0.6749 - val_accuracy: 0.2647
Epoch 3/20
7/7 [==============================] - 0s 53ms/step - loss: 0.6654 - accuracy: 0.4676 - val_loss: 0.6616 - val_accuracy: 0.2647
Epoch 4/20
7/7 [==============================] - 0s 54ms/step - loss: 0.6442 - accuracy: 0.4676 - val_loss: 0.6506 - val_accuracy: 0.2647
Epoch 5/20
7/7 [==============================] - 0s 48ms/step - loss: 0.6194 - accuracy: 0.4676 - val_loss: 0.6587 - val_accuracy: 0.2647
Epoch 6/20
7/7 [==============================] - 0s 45ms/step - loss: 0.6016 - accuracy: 0.4676 - val_loss: 0.6669 - val_accuracy: 0.2647
Epoch 7/20
7/7 [==============================] - 0s 47ms/step - loss: 0.5934 - accuracy: 0.4676 - val_loss: 0.6491 - val_accuracy: 0.2647
Epoch 8/20
7/7 [==============================] - 0s 50ms/step - loss: 0.5839 - accuracy: 0.4676 - val_loss: 0.6426 - val_accuracy: 0.2647
Epoch 9/20
7/7 [==============================] - 0s 48ms/step - loss: 0.5610 - accuracy: 0.4892 - val_loss: 0.6243 - val_accuracy: 0.2941
Epoch 10/20
7/7 [==============================] - 0s 45ms/step - loss: 0.5404 - accuracy: 0.5108 - val_loss: 0.6080 - val_accuracy: 0.5000
```

Figure 30B:
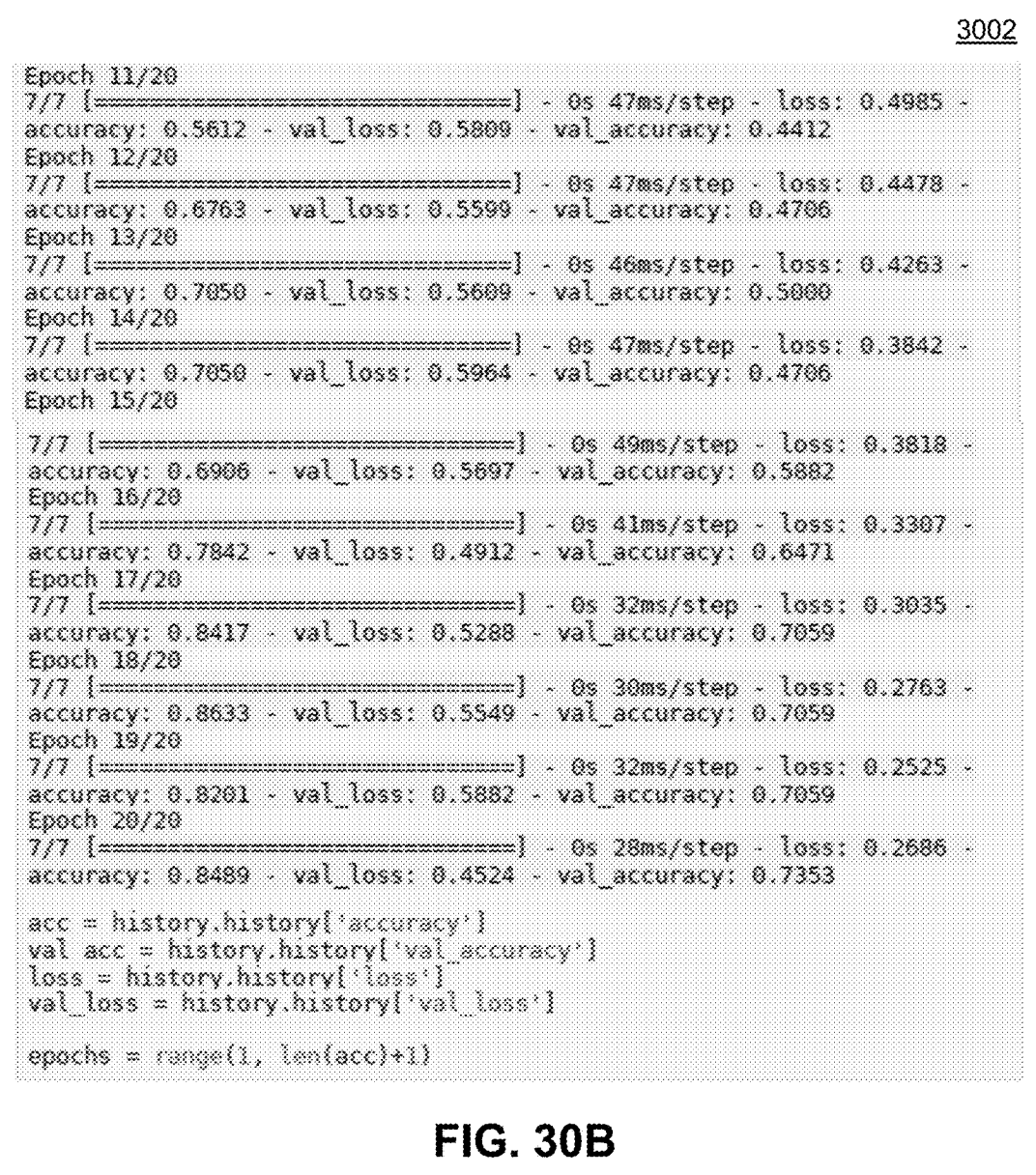

```
Epoch 11/20
7/7 [==============================] - 0s 47ms/step - loss: 0.4985 -
accuracy: 0.5812 - val_loss: 0.5808 - val_accuracy: 0.4412
Epoch 12/20
7/7 [==============================] - 0s 47ms/step - loss: 0.4478 -
accuracy: 0.6763 - val_loss: 0.5599 - val_accuracy: 0.4706
Epoch 13/20
7/7 [==============================] - 0s 46ms/step - loss: 0.4263 -
accuracy: 0.7050 - val_loss: 0.5600 - val_accuracy: 0.5000
Epoch 14/20
7/7 [==============================] - 0s 47ms/step - loss: 0.3842 -
accuracy: 0.7050 - val_loss: 0.5964 - val_accuracy: 0.4706
Epoch 15/20
7/7 [==============================] - 0s 49ms/step - loss: 0.3818 -
accuracy: 0.6906 - val_loss: 0.5697 - val_accuracy: 0.5882
Epoch 16/20
7/7 [==============================] - 0s 41ms/step - loss: 0.3307 -
accuracy: 0.7842 - val_loss: 0.4912 - val_accuracy: 0.6471
Epoch 17/20
7/7 [==============================] - 0s 32ms/step - loss: 0.3035 -
accuracy: 0.8417 - val_loss: 0.5288 - val_accuracy: 0.7059
Epoch 18/20
7/7 [==============================] - 0s 30ms/step - loss: 0.2763 -
accuracy: 0.8633 - val_loss: 0.5549 - val_accuracy: 0.7059
Epoch 19/20
7/7 [==============================] - 0s 32ms/step - loss: 0.2525 -
accuracy: 0.8201 - val_loss: 0.5882 - val_accuracy: 0.7059
Epoch 20/20
7/7 [==============================] - 0s 28ms/step - loss: 0.2686 -
accuracy: 0.8489 - val_loss: 0.4524 - val_accuracy: 0.7353 acc = history.history['accuracy']
val_acc = history.history['val_accuracy']
loss = history.history['loss']
val_loss = history.history['val_loss']

epochs = range(1, len(acc)+1)
```

Figure 31A:
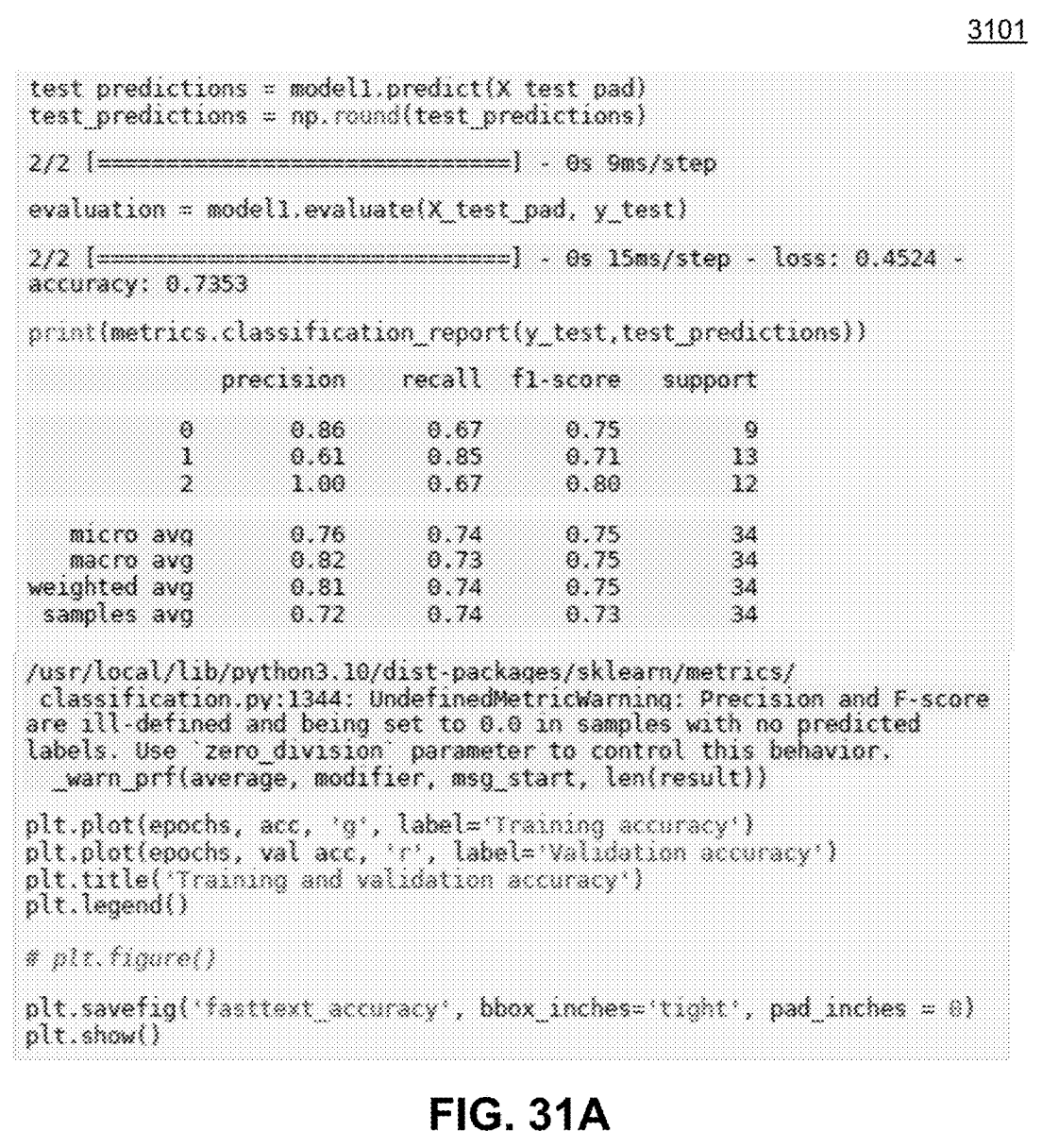

```
test_predictions = model1.predict(X_test_pad)
test_predictions = np.round(test_predictions)

2/2 [==============================] - 0s 9ms/step evaluation = model1.evaluate(X_test_pad, y_test)

2/2 [==============================] - 0s 15ms/step - loss: 0.4524 -
accuracy: 0.7353 print(metrics.classification_report(y_test, test_predictions))

precision    recall  f1-score   support 0       0.86      0.67      0.75         9
           1       0.61      0.85      0.71        13
           2       1.00      0.67      0.80        12 micro avg       0.76      0.74      0.75        34
   macro avg       0.82      0.73      0.75        34
weighted avg       0.81      0.74      0.75        34
 samples avg       0.72      0.74      0.73        34

/usr/local/lib/python3.10/dist-packages/sklearn/metrics/
_classification.py:1344: UndefinedMetricWarning: Precision and F-score
are ill-defined and being set to 0.0 in samples with no predicted
labels. Use `zero_division` parameter to control this behavior.
  _warn_prf(average, modifier, msg_start, len(result))

plt.plot(epochs, acc, 'g', label='Training accuracy')
plt.plot(epochs, val_acc, 'r', label='Validation accuracy')
plt.title('Training and validation accuracy')
plt.legend()

plt.figure()

plt.savefig('fasttext_accuracy', bbox_inches='tight', pad_inches = 0)
plt.show()
```

Figures 32, 33A:
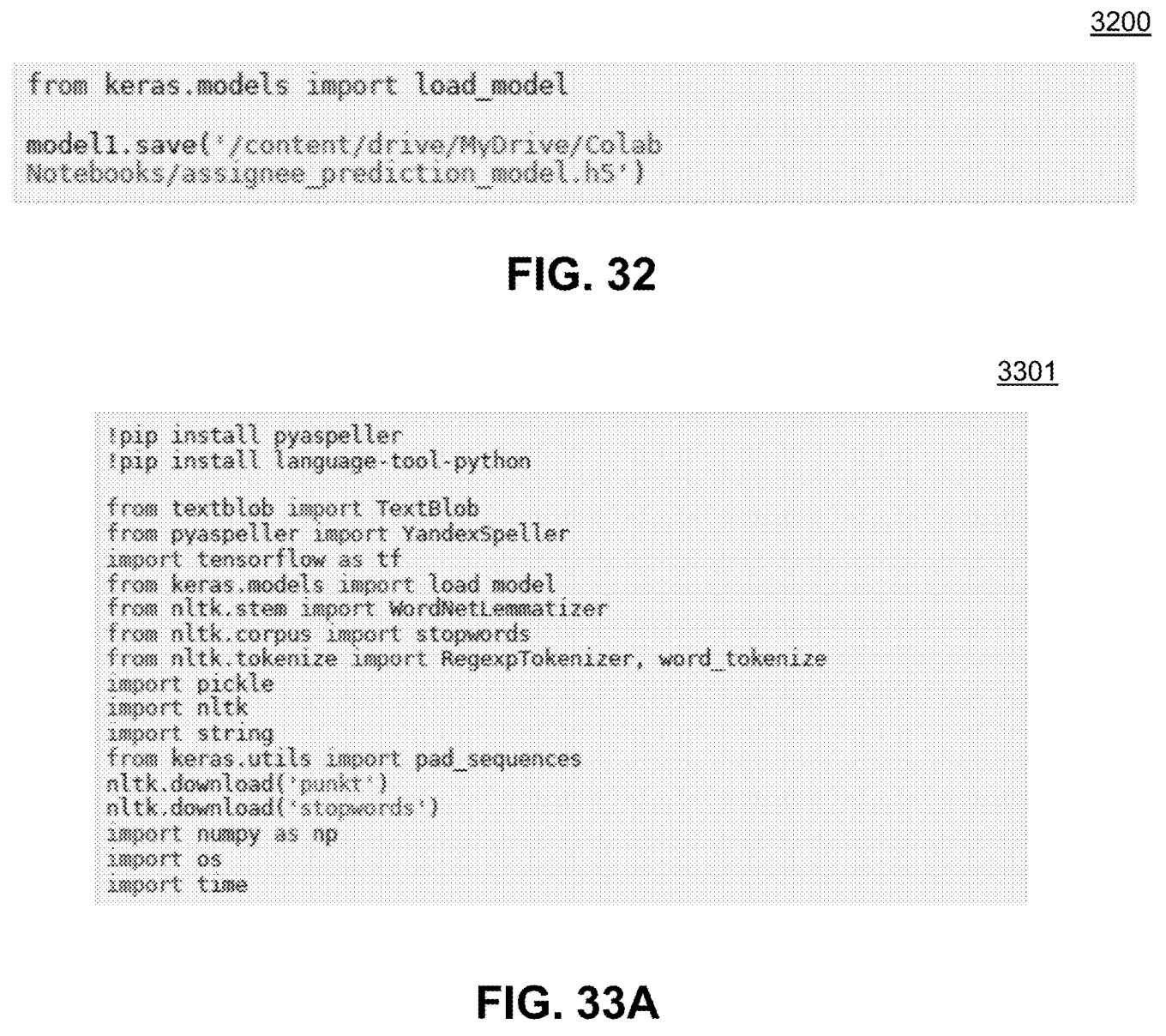

```
from keras.models import load_model model1.save('/content/drive/MyDrive/Colab
Notebooks/assignee_prediction_model1.h5')
```

```
!pip install pyaspeller
!pip install language-tool-python from textblob import TextBlob
from pyaspeller import YandexSpeller
import tensorflow as tf
from keras.models import load_model
from nltk.stem import WordNetLemmatizer
from nltk.corpus import stopwords
from nltk.tokenize import RegexpTokenizer, word_tokenize
import pickle
import nltk
import string
from keras.utils import pad_sequences
nltk.download('punkt')
nltk.download('stopwords')
import numpy as np
import os
import time
```

```
Requirement already satisfied: pyaspeller in
/usr/local/lib/python3.10/dist-packages (1.2.0)
Requirement already satisfied: requests<3.0.0,>=2.27.1 in
/usr/local/lib/python3.10/dist-packages (from pyaspeller) (2.31.0)
Requirement already satisfied: charset-normalizer4,>=2 in
/usr/local/lib/python3.10/dist-packages (from requests<3.0.0,>=2.27.1-
>pyaspeller) (3.2.0)
Requirement already satisfied: idna<4,>=2.5 in
/usr/local/lib/python3.10/dist-packages (from requests<3.0.0,>=2.27.1-
>pyaspeller) (3.4)
Requirement already satisfied: urllib3<3,>=1.21.1 in
/usr/local/lib/python3.10/dist-packages (from requests<3.0.0,>=2.27.1-
>pyaspeller) (2.0.4)
Requirement already satisfied: certifi>=2017.4.17 in
/usr/local/lib/python3.10/dist-packages (from requests<3.0.0,>=2.27.1-
>pyaspeller) (2023.7.22)
Requirement already satisfied: language-tool-python in
/usr/local/lib/python3.10/dist-packages (2.7.1)
Requirement already satisfied: requests in
/usr/local/lib/python3.10/dist-packages (from language-tool-python)
(2.31.0)
Requirement already satisfied: tqdm in /usr/local/lib/python3.10/dist-
packages (from language-tool-python) (4.66.1)
Requirement already satisfied: charset-normalizer4,>=2 in
/usr/local/lib/python3.10/dist-packages (from requests->language-tool-
python) (3.2.0)
Requirement already satisfied: idna<4,>=2.5 in
/usr/local/lib/python3.10/dist-packages (from requests->language-tool-
python) (3.4)
Requirement already satisfied: urllib3<3,>=1.21.1 in
/usr/local/lib/python3.10/dist-packages (from requests->language-tool-
python) (2.0.4)
Requirement already satisfied: certifi>=2017.4.17 in
/usr/local/lib/python3.10/dist-packages (from requests->language-tool-
python) (2023.7.22)
[nltk_data] Downloading package punkt to /root/nltk_data...
[nltk_data]   Package punkt is already up-to-date!
[nltk_data] Downloading package stopwords to /root/nltk_data...
[nltk_data]   Package stopwords is already up-to-date!
```

```
path_to_file = "/content/drive/MyDrive/Colab Notebooks/text-summary-
OTEL.txt"
text = open(path_to_file, 'rb').read().decode(encoding='utf-8')
vocab = sorted(set(text))
ids_from_chars = tf.keras.layers.StringLookup(vocabulary=list(vocab),
mask_token=None)
chars_from_ids =
tf.keras.layers.StringLookup(vocabulary=ids_from_chars.get_vocabulary(
), invert=True, mask_token=None)
```

```
# Length of the vocabulary in StringLookup Layer
vocab_size = 103

# The embedding dimension
embedding_dim = 256

# Number of RNN units
rnn_units = 1024 class MyModel(tf.keras.Model):
    def __init__(self, vocab_size, embedding_dim, rnn_units):
        super().__init__(self)
        self.embedding = tf.keras.layers.Embedding(vocab_size,
embedding_dim)
        self.gru = tf.keras.layers.GRU(rnn_units,
                                       return_sequences=True,
                                       return_state=True)
        self.dense = tf.keras.layers.Dense(vocab_size)

def call(self, inputs, states=None, return_state=False,
```

```
    training=False):
      x = inputs
      x = self.embedding(x, training=training)
      if states is None:
        states = self.gru.get_initial_state(x)
      x, states = self.gru(x, initial_state=states, training=training)
      x = self.dense(x, training=training)

if return_state:
        return x, states
      else:
        return x class OneStep(tf.keras.Model):
  def __init__(self, model, chars_from_ids, ids_from_chars,
temperature=1.0):
    super().__init__()
    self.temperature = temperature
    self.model = model
    self.chars_from_ids = chars_from_ids
    self.ids_from_chars = ids_from_chars

# Create a mask to prevent "[UNK]" from being generated.
    skip_ids = self.ids_from_chars(['[UNK]'])[:, None]
    sparse_mask = tf.SparseTensor(
      # Put a -inf at each bad index.
      values=[-float('inf')]*len(skip_ids),
      indices=skip_ids,
      # Match the shape to the vocabulary
      dense_shape=[len(ids_from_chars.get_vocabulary())])
    self.prediction_mask = tf.sparse.to_dense(sparse_mask)

@tf.function
  def generate_one_step(self, inputs, states=None):
    # Convert strings to token IDs.
    input_chars = tf.strings.unicode_split(inputs, 'UTF-8')
    input_ids = self.ids_from_chars(input_chars).to_tensor()

# Run the model.
    # predicted_logits.shape is (batch, char, next_char_logits)
    predicted_logits, states = self.model(inputs=input_ids,
                                          states=states,
```

```
    return_state=True)

# Only use the last prediction.
predicted_logits = predicted_logits[:, -1, :]
predicted_logits = predicted_logits/self.temperature
# Apply the prediction mask: prevent "[UNK]" from being generated.
predicted_logits = predicted_logits + self.prediction_mask

# Sample the output logits to generate token IDs.
predicted_ids = tf.random.categorical(predicted_logits,
num_samples=1)
predicted_ids = tf.squeeze(predicted_ids, axis=-1)

# Convert from token ids to characters
predicted_chars = self.chars_from_ids(predicted_ids)

# Return the characters and model state.
return predicted_chars, states model2 = MyModel(
    vocab_size=vocab_size,
    embedding_dim=embedding_dim,
    rnn_units=rnn_units)
model2.load_weights('/content/drive/MyDrive/Colab
Notebooks/generate_subtask model1')
one_step_model = OneStep(model2, chars_from_ids, ids_from_chars)

one_step_model = OneStep(model2, chars_from_ids, ids_from_chars)
```

```
def error_correct_pyspeller(sample_text):
    speller = Yandexspeller()
    fixed = speller.spelled(sample_text)
    return fixed states = None
next_char = tf.constant([['drp team autotriage make drp repo 100
compliance']])
result = [next_char]

for n in range(500):
    next_char, states = one_step_model.generate_one_step(next_char,
states=states)
    result.append(next_char)

result = tf.strings.join(result)

index = 1
summaries = []
for string in result[0].numpy().decode('utf-8').split('\n'):
    if len(string) > 45:
        summaries.append(error_correct_pyspeller(string))
        index+=1
```

```
names = ['speedy', 'stacey strand', 'marceline_friedman']
tokenizer_obj_loaded = None
with open('/content/drive/MyDrive/Colab Notebooks/tokenizer_pickle',
'rb') as handle:
    tokenizer_obj_loaded = pickle.load(handle)

def CleanTokenize_loaded(lines):
    tweets = list[]

for line in lines:
        # tokenize the text
        tokens = word_tokenize(line)

# remove punctuations
        table = str.maketrans('', '', string.punctuation)
        stripped = [w.translate(table) for w in tokens]

words = [word for word in stripped if word.isalpha()]
        stop_words = set(stopwords.words('english'))
        words = [w for w in words if not w in stop_words]

tweets.append(words)
    return tweets def get_predictions(x_test):
    model_test = load_model('/content/drive/MyDrive/Colab
Notebooks/assignee_prediction_model.h5')
    y_predict = model_test.predict(x_test)
    return y_predict def get_predicted_array_as_one_hot(y_predictions):
    a = y_predictions.copy()
    b = np.zeros_like(a)
    b[np.arange(len(a)), a.argmax(1)] = 1
    return b def get_assignees_names(names, predictions):
    names_list = []
    for i in np.argmax(predictions, axis=1):
```

Figure 37B:
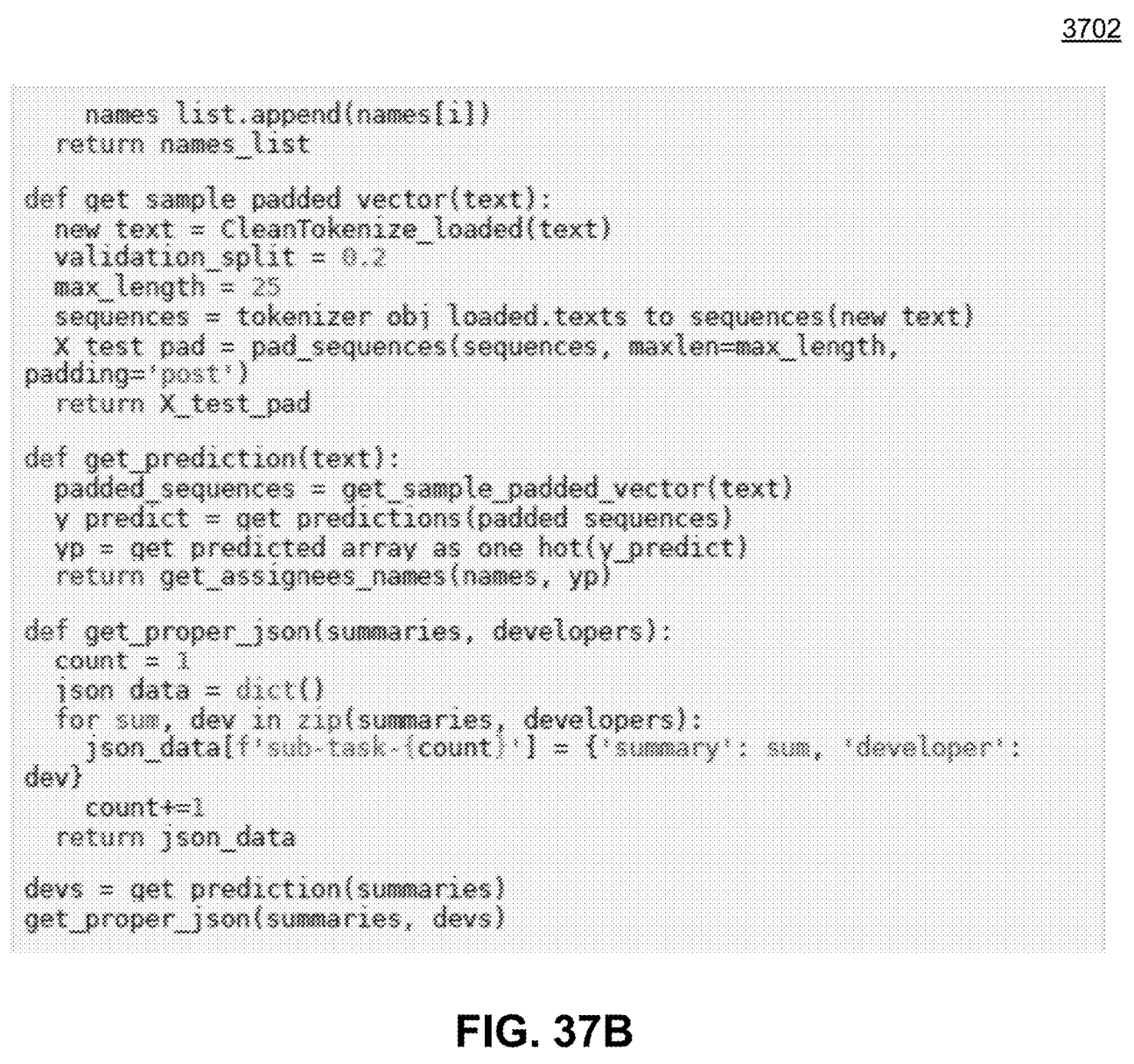

```
        names_list.append(names[i])
    return names_list def get_sample_padded_vector(text):
    new_text = CleanTokenize_loaded(text)
    validation_split = 0.2
    max_length = 25
    sequences = tokenizer_obj.loaded.texts_to_sequences(new_text)
    X_test_pad = pad_sequences(sequences, maxlen=max_length,
padding='post')
    return X_test_pad def get_prediction(text):
    padded_sequences = get_sample_padded_vector(text)
    Y_predict = get_predictions(padded_sequences)
    yp = get predicted array as one hot(y_predict)
    return get_assignees_names(names, yp)

def get_proper_json(summaries, developers):
    count = 1
    json_data = dict()
    for sum, dev in zip(summaries, developers):
        json_data[f'sub-task-{count}'] = {'summary': sum, 'developer':
dev}
        count+=1
    return json_data devs = get_prediction(summaries)
get_proper_json(summaries, devs)
```

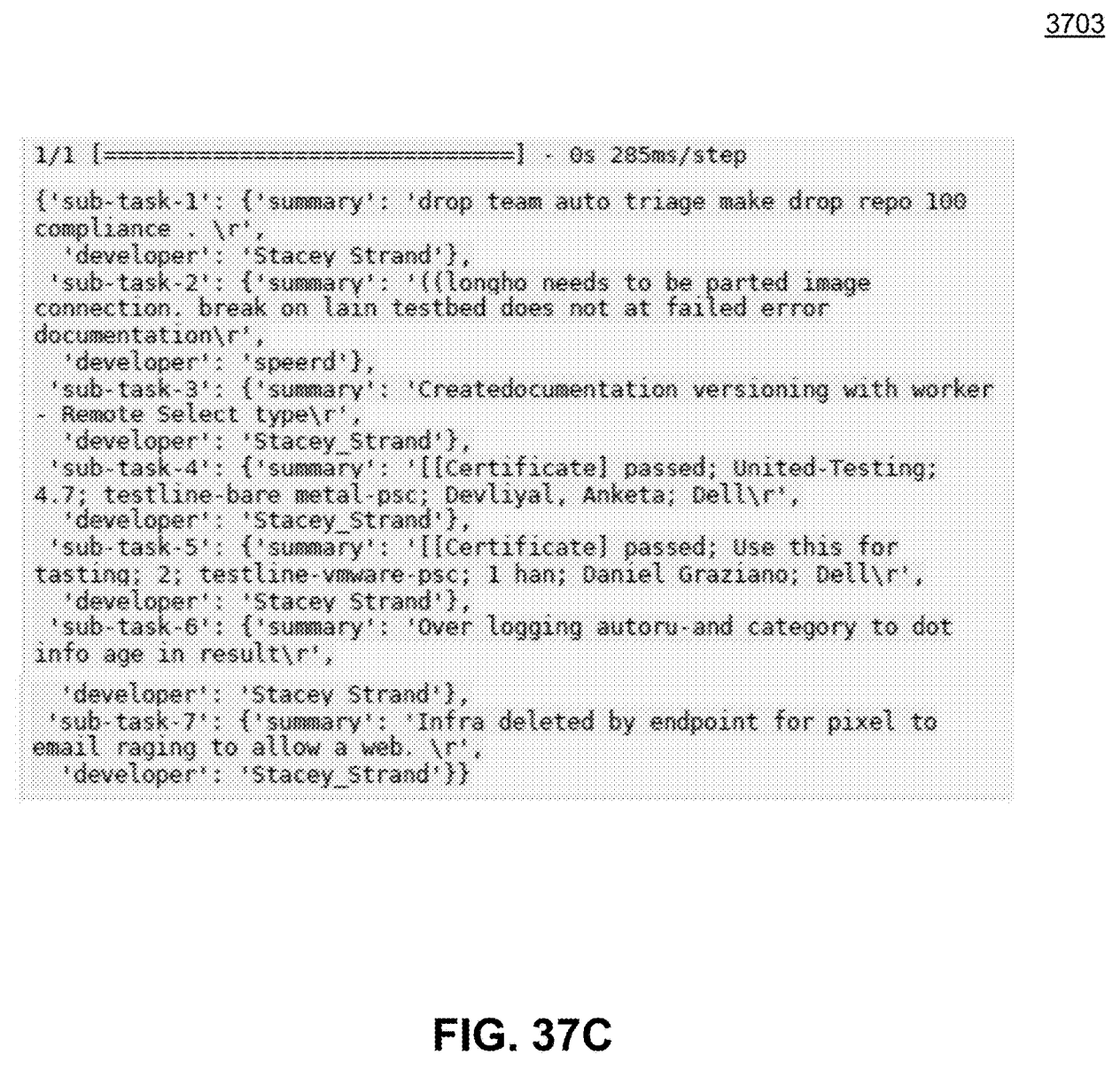

```
1/1 [==========] - 0s 285ms/step

{'sub-task-1': {'summary': 'drop team auto triage make drop repo 100
compliance.\r',
    'developer': 'Stacey Strand'},
'sub-task-2': {'summary': '((longho needs to be parted image
connection. break on lain testbed does not at failed error
documentation\r',
    'developer': 'speard'),
'sub-task-3': {'summary': 'Createdocumentation versioning with worker
- Remote Select type\r',
    'developer': 'Stacey Strand'},
'sub-task-4': {'summary': '[(Certificate] passed; United-Testing;
4.7;testline-bare metal-psc; Devliyal, Anketa, Dell\r',
    'developer': 'Stacey Strand'},
'sub-task-5': {'summary': '[(Certificate] passed; Use this for
testing; 2: testline vmware psc; l han; Daniel Graziano; Dell\r',
    'developer': 'Stacey Strand'},
'sub-task-6': {'summary': 'Over logging autoru and category to dot
info age in result\r',
    'developer': 'Stacey Strand'},
'sub-task-7': {'summary': 'Infra deleted by endpoint for pixel to
email raging to allow a web.\r',
    'developer': 'Stacey_strand'}}
```

FIG. 37C

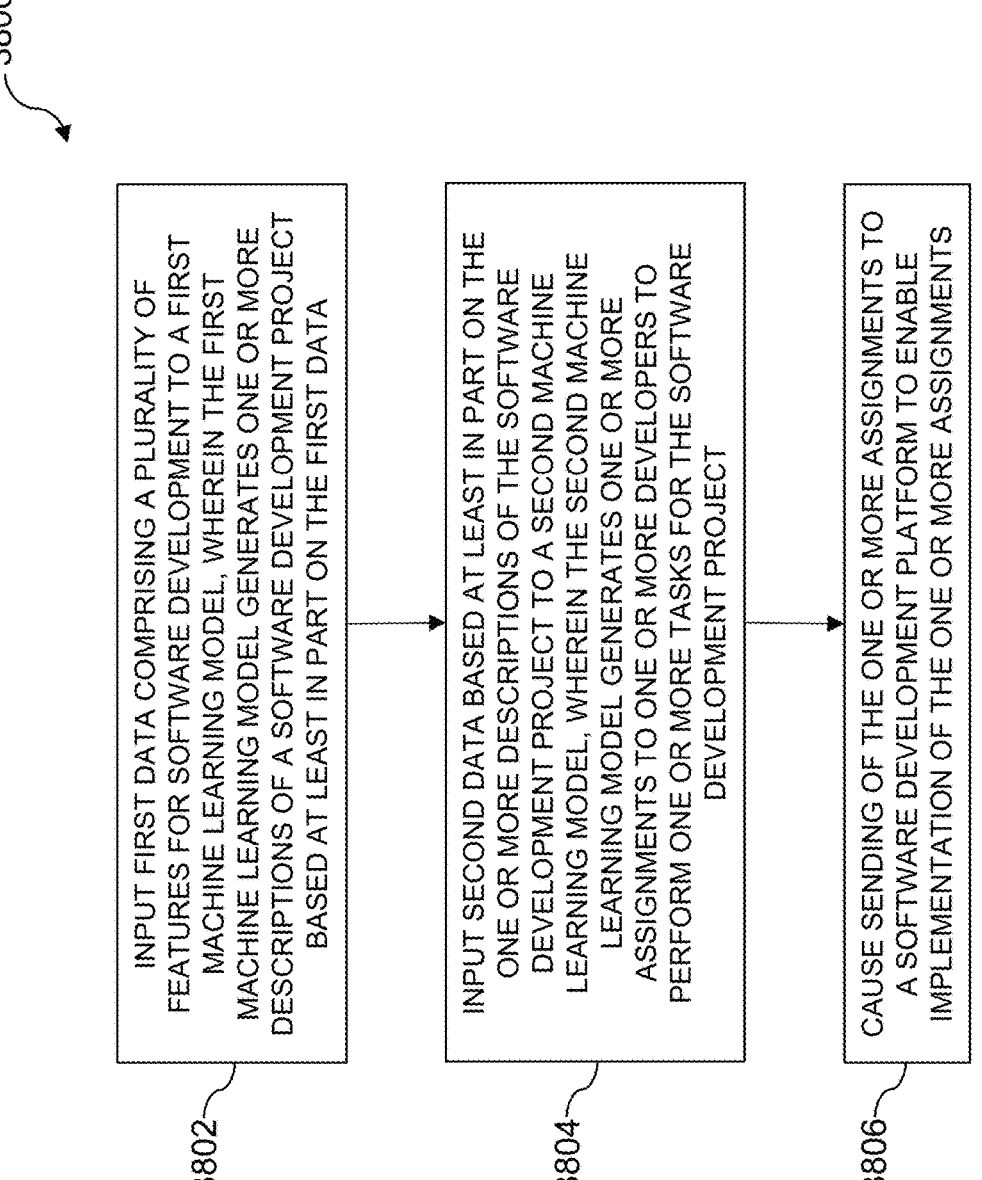

3800

3802 — INPUT FIRST DATA COMPRISING A PLURALITY OF FEATURES FOR SOFTWARE DEVELOPMENT TO A FIRST MACHINE LEARNING MODEL, WHEREIN THE FIRST MACHINE LEARNING MODEL GENERATES ONE OR MORE DESCRIPTIONS OF A SOFTWARE DEVELOPMENT PROJECT BASED AT LEAST IN PART ON THE FIRST DATA

3804 — INPUT SECOND DATA BASED AT LEAST IN PART ON THE ONE OR MORE DESCRIPTIONS OF THE SOFTWARE DEVELOPMENT PROJECT TO A SECOND MACHINE LEARNING MODEL, WHEREIN THE SECOND MACHINE LEARNING MODEL GENERATES ONE OR MORE ASSIGNMENTS TO ONE OR MORE DEVELOPERS TO PERFORM ONE OR MORE TASKS FOR THE SOFTWARE DEVELOPMENT PROJECT

3806 — CAUSE SENDING OF THE ONE OR MORE ASSIGNMENTS TO A SOFTWARE DEVELOPMENT PLATFORM TO ENABLE IMPLEMENTATION OF THE ONE OR MORE ASSIGNMENTS

FIG. 38

SOFTWARE DEVELOPMENT PLANNING USING MACHINE LEARNING

COPYRIGHT NOTICE

FIELD

The field relates generally to information processing systems, and more particularly to software development planning in information processing systems.

BACKGROUND

Narratives for new software features or software products outline, for example, objectives and processes to accomplish the objectives. With conventional approaches, product owners and software engineers must closely collaborate in order to generate such narratives and formulate a strategic plan for product delivery. The collaboration between product owners and software engineers leverages the technical expertise of each party in an attempt to effectively implement necessary features and functionalities aligned with product requirements.

However, the lack of automation with current approaches for software development leads to inconsistencies, ambiguity and errors in the creation and implementation of software development plans, wasting valuable computer resources and resulting in software of unsatisfactory quality.

SUMMARY

Embodiments provide a software development planning platform in an information processing system.

For example, in one embodiment, a method comprises inputting first data comprising a plurality of features for software development to a first machine learning model, wherein the first machine learning model generates one or more descriptions of a software development project based at least in part on the first data, and inputting second data based at least in part on the one or more descriptions of the software development project to a second machine learning model, wherein the second machine learning model generates one or more assignments to one or more developers to perform one or more tasks for the software development project. The method further comprises causing sending of the one or more assignments to a software development project platform to enable implementation of the one or more assignments.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 4 depicts example pseudocode for creating software development issues, tasks and assignments according to an illustrative embodiment.

FIGS. 5A and 5B depict example pseudocode for importation of libraries according to an illustrative embodiment.

FIG. 6 depicts example pseudocode for loading a software development project platform ticket dataset according to an illustrative embodiment.

FIG. 7 depicts example pseudocode for data formatting prior to inputting the data to one or more machine learning models according to an illustrative embodiment.

FIG. 8 depicts example pseudocode for column feature selection for training data according to an illustrative embodiment.

FIG. 9 depicts example pseudocode for label encoding according to an illustrative embodiment.

FIGS. 10A and 10B depict example pseudocode for removing certain features from text data prior to inputting the data to one or more machine learning models according to an illustrative embodiment.

FIG. 11 depicts example pseudocode for lemmatization of data prior to inputting the data to one or more machine learning models according to an illustrative embodiment.

FIG. 12 depicts example pseudocode for performing join and sort functions on text data prior to inputting the data to one or more machine learning models according to an illustrative embodiment.

FIG. 13 depicts example pseudocode for vectorizing text data prior to inputting the data to one or more machine learning models according to an illustrative embodiment.

FIG. 14 depicts example pseudocode for converting tokens to character identifiers according to an illustrative embodiment.

FIG. 15 depicts example pseudocode for using Tensorflow text to split strings by character according to an illustrative embodiment.

FIG. 16 depicts example pseudocode for conversion of individual characters to sequences of desired size according to an illustrative embodiment.

FIG. 17 depicts example pseudocode for a function which duplicates and shifts an input sequence according to an illustrative embodiment.

FIG. 18 depicts example pseudocode for creating batches of training data according to an illustrative embodiment.

FIG. 19 depicts example pseudocode for building a recurrent neural network (RNN) machine learning model according to an illustrative embodiment.

FIG. 20 depicts example pseudocode for attaching an optimizer and a loss function to a machine learning model according to an illustrative embodiment.

FIG. 21 depicts example pseudocode for saving checkpoints during training of a machine learning model according to an illustrative embodiment.

FIG. 22 depicts example pseudocode for defining a number of epochs for training a machine learning model according to an illustrative embodiment.

FIG. 23 depicts example pseudocode for saving a trained machine learning model according to an illustrative embodiment.

FIGS. 24A, 24B and 24C depict example pseudocode for executing a machine learning model and generating a prediction from the machine learning model according to an illustrative embodiment.

FIG. 25 depicts example pseudocode for label encoding according to an illustrative embodiment.

FIG. 26 depicts example pseudocode for tokenization according to an illustrative embodiment.

FIG. 27 depicts example pseudocode for generating padded sequences according to an illustrative embodiment.

FIGS. 28A and 28B depict example pseudocode for performing word embedding according to an illustrative embodiment.

FIG. 29 depicts example pseudocode for building a long short-term memory (LSTM) machine learning model according to an illustrative embodiment.

FIGS. 30A and 30B depict example pseudocode for running epochs in connection with training a machine learning model according to an illustrative embodiment.

FIG. 31A depicts example pseudocode for testing and evaluating a machine learning model according to an illustrative embodiment.

FIG. 32 depicts example pseudocode for saving a trained machine learning model according to an illustrative embodiment.

FIGS. 33A and 33B depict example pseudocode for setting up preferred installer program (pip) modules for a plurality of machine learning models according to an illustrative embodiment.

FIG. 34 depicts example pseudocode for loading data for a plurality of machine learning models according to an illustrative embodiment.

FIGS. 35A, 35B and 35C depict example pseudocode for loading a trained machine learning model according to an illustrative embodiment.

FIG. 36 depicts example pseudocode for generating a predicted software development description from a machine learning model according to an illustrative embodiment.

FIGS. 37A, 37B and 37C depict example pseudocode for generating predicted developer assignments for a software development workflow from a machine learning model according to an illustrative embodiment.

FIG. 38 depicts a process for software development planning according to an illustrative embodiment.

DETAILED DESCRIPTION

Figure 1:
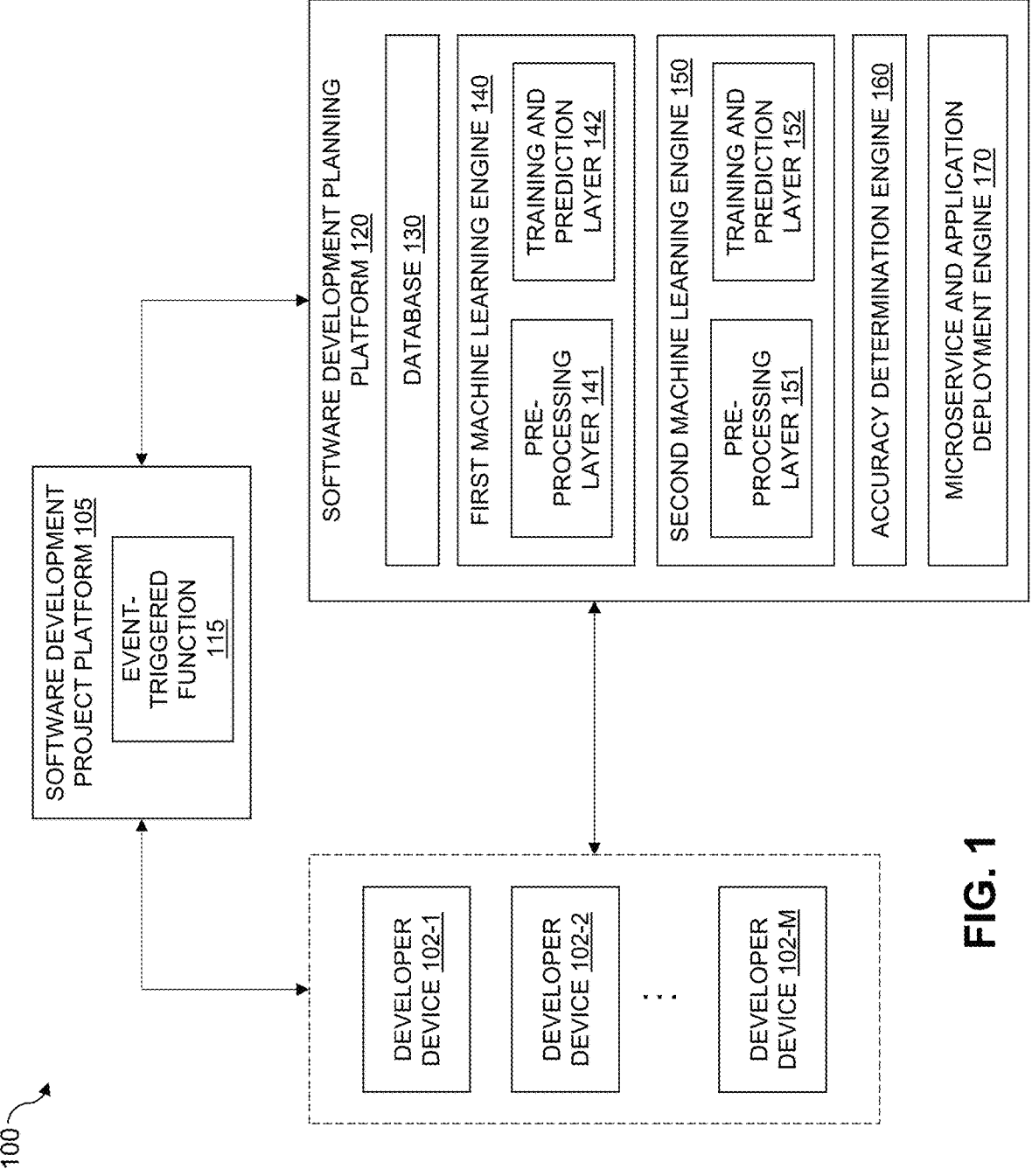
FIG. 1 depicts an information processing system with a software development planning platform according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a developer device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" refers to a set of subroutine definitions, protocols, and/or tools for building software. Generally, an API defines communication between software components. APIs permit software applications to be written so as to be consistent with an operating environment or website. In a non-limiting example, APIs enable software components to communicate with each other using designated definitions and protocols.

FIG. 1 shows an information processing system 100 configured in accordance with an illustrative embodiment. The information processing system 100 comprises developer devices 102-1, 102-2, . . . 102-M (collectively "developer devices 102"), at least one software development project platform 105 and a software development planning platform 120. The developer devices 102, software development project platform 105 and software development planning platform 120 communicate with each other over a network as shown by the arrows connecting the developer devices 102, software development project platform 105 and software development planning platform 120. The variable M and other similar index variables herein such as K and L are assumed to be arbitrary positive integers greater than or equal to one.

The developer devices 102 and one or more devices of the software development project platform 105 can comprise, for example, Internet of Things (IoT) devices, server, desktop, laptop or tablet computers, mobile telephones, or other types of processing devices capable of communicating with the software development planning platform 120 over the network. Such devices are examples of what are more generally referred to herein as "processing devices." Some of these processing devices are also generally referred to herein as "computers." The developer devices 102 and one or more devices of the software development project platform 105 may also or alternately comprise virtualized computing resources, such as virtual machines (VMs), containers, etc. The developer devices 102 and/or one or more devices of the software development project platform 105 in some embodiments comprise respective computers associated with a particular company, organization or other enterprise.

The terms "developer," "administrator," "personnel" or "user" herein are intended to be broadly construed so as to encompass numerous arrangements of human, hardware, software or firmware entities, as well as combinations of such entities. Software development management services may be provided for users utilizing one or more machine learning models, although it is to be appreciated that other types of infrastructure arrangements could be used. At least a portion of the available services and functionalities provided by the software development planning platform 120 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the software development planning platform 120, as well as to support communication between the software development planning platform 120 and connected devices (e.g., developer devices 102 and one or more devices of the software development project platform 105) and/or other related systems and devices not explicitly shown.

In some embodiments, the developer devices 102 are assumed to be associated with repair technicians, system administrators, information technology (IT) managers, software developers, release management personnel or other authorized personnel configured to access and utilize the software development planning platform 120. The developer devices 102 can also be respectively associated with one or more users requiring the services of the software development project platform 105 and/or software development planning platform 120. Examples of software development project platforms include, but are not necessarily limited to, Jira® and Confluence®.

Regardless of a selected methodology for software development, significant investment of time, active participation and collaboration between necessary and interested parties is essential at least during a planning phase of software development. This collaborative effort may involve product owners, developers and Scrum® masters. A Scrum® master facilitates and manages information exchange between software development team members. With conventional approaches, the collaborative process involves lengthy team discussions, a lack of efficient historical data references, minimal support for product owners when crafting software development narratives (also referred to herein as "stories") and challenges when estimating resources and effort required to complete workflows and tasks. As used herein, a "story" refers to a narrative or description of a software development project that can appear on a software development project platform (e.g., Jira® and Confluence®). A story, which may be written from the perspective of a user, includes, for example, an explanation of goals of a software development project, wherein the goals can be described in terms of individual goals of each participant (e.g., developer). Stories may further include tasks, which can be assigned to team members. Stories can include details of a project from inception to completion, and can include descriptions of various functions and types of work such as, but not necessarily limited to, coding, development and quality assurance.

As noted hereinabove, the lack of automation with current approaches for software development leads to inconsistencies, ambiguity and errors in the creation and implementation of software development plans, which, for example, wastes valuable computer resources and results in software of unsatisfactory quality. In more detail, the manual generation of stories can be a time-intensive endeavor, particularly when creating a substantial number of stories. Moreover, with current techniques, story generation can result in disparities in terms of detail, format and quality among stories. These inconsistencies may pose challenges for software engineers when interpreting requirements and implementing features of a software development project. Conventional approaches for story generation also introduce ambiguity or unclear requirements, leading to misunderstandings and errors during development. This, in turn, can trigger rework, project delays, and resource waste.

In order to address the problems with current approaches, illustrative embodiments provide technical solutions that include techniques for training and utilizing two machine learning models to predict and generate software development project descriptions (e.g., stories) and workload and/or task assignments to be performed by developers in connection with a software development project. The predictions are based on features outlining the requirements of a software development project input by a user to an application. The features may be input in textual form and converted to appropriate formats for analysis by the machine learning models.

Advantageously, since the machine learning models are trained with data from a software development project platform detailing past narratives, the embodiments generate narratives that seamlessly align with past narratives, ensuring conformance with a team's objectives and operational history. As a result of extensive analysis and training from large datasets of software development projects from a software development project platform, the machine learning models predict and generate project descriptions and assignments aligned with customer needs and preferences, and which are suited to the abilities and skills of team members.

As an additional advantage, in connection with assigning workloads and tasks, the second machine learning model factors not only past performance and skills of team members, but also continuously retrieves data from the software development project platform to dynamically adapt to the evolving expertise of team members. The second machine learning model is continuously trained and re-trained with new data detailing strengths, weaknesses and newly acquired skills of team members and can adjust task assignments to optimize productivity and skill development over time.

The illustrative embodiments further advantageously provide real-time monitoring of team members' workloads and capacity based on, for example, active projects on the software development project platform. The second machine learning model, therefore, intelligently distributes tasks among team members based on real-time workloads, to prevent overload or underutilization, ensuring that developers and other team members are working at an optimal pace. This dynamic workload balancing further considers various factors such as, but not necessarily limited to, task complexity, deadlines and the current commitments of team members.

The software development planning platform 120 in the present embodiment is assumed to be accessible to the developer devices 102 and/or software development project platform 105 and vice versa over a network. The network is assumed to comprise a portion of a global computer network such as the Internet, although other types of networks can be part of the network, including a wide area network (WAN), a local area network (LAN), a satellite network, a telephone or cable network, a cellular network, a wireless network such as a WiFi or WiMAX network, or various portions or combinations of these and other types of networks. The network in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing. Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the software development planning platform 120 includes a database 130, a first machine learning engine 140, a second machine learning engine 150, an accuracy determination engine 160 and a microservice and application deployment engine 170. The first machine learning engine 140 includes a pre-processing layer 141 and a training and prediction layer 142. The second machine learning engine 150 includes a pre-processing layer 151 and a training and prediction layer 152.

Figure 2:
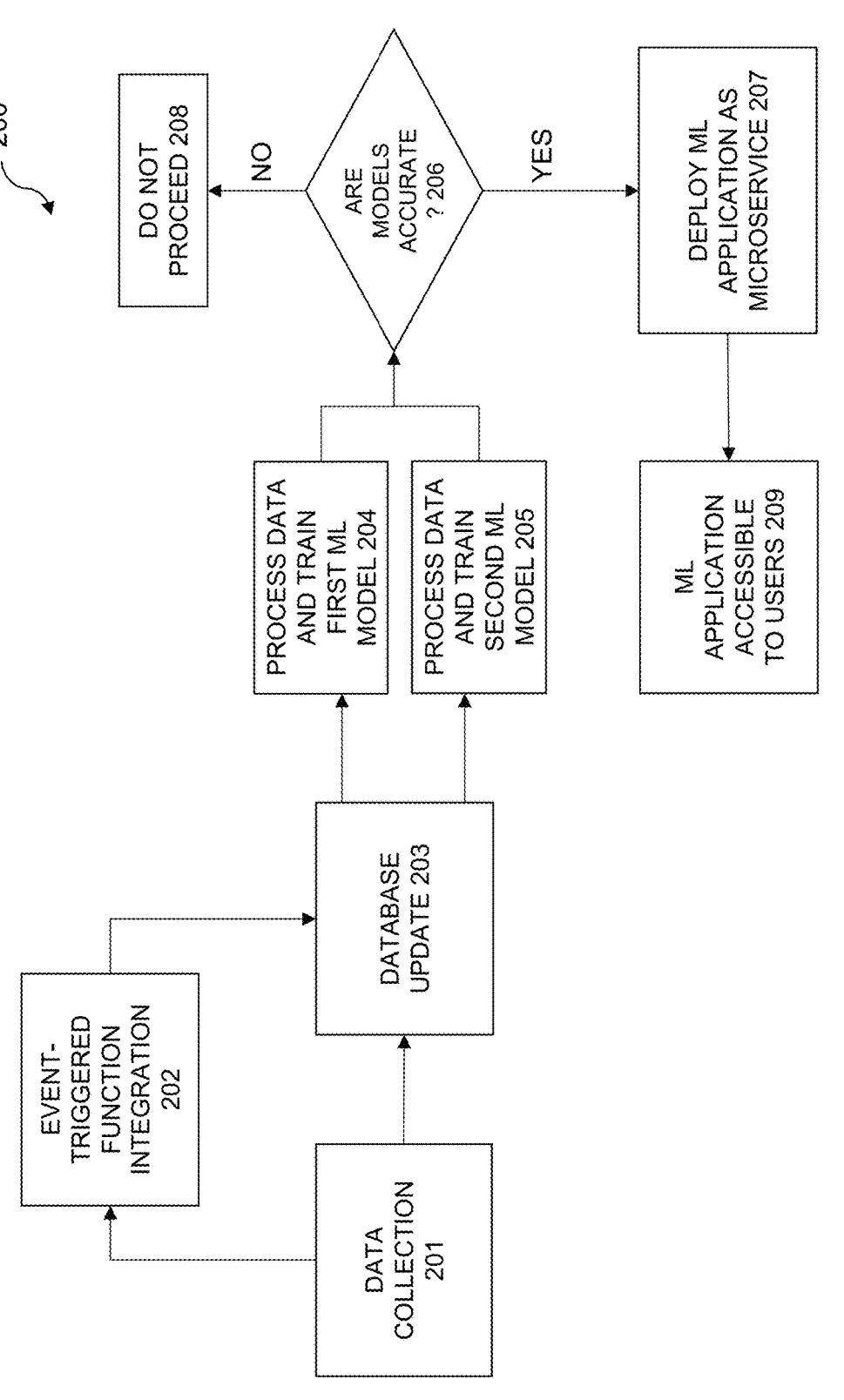
FIG. 2 depicts an operational flow for development and deployment of machine learning models used in connection with software development management according to an illustrative embodiment.

Referring to the operational flow 200 in FIG. 2 in conjunction with the information processing system 100 in FIG. 1, first and second machine learning models are developed and deployed based on data from the software development project platform 105. For example, the software development planning platform 120 continuously monitors the software development project platform 105 to detect one or more events on the software development project platform 105. The one or more events can include, for example, the creation of a new software development project, changes or modifications to a software development project, the creation of a story for a software development project, changes or modifications to a story for a software development project, the creation of support requests (e.g., tickets) in connection with a software development project, the creation of a placeholder in the software development project platform 105 to address an issue with the software development project, etc.

Referring back to FIG. 1 and to steps 201, 202 and 203 of the operational flow 200 in FIG. 2, an event-triggered function 115 is integrated into the software development project platform 105 to detect the one or more events and trigger collection and loading of data into the database 130 in response to the detecting. As used herein, an "event-triggered function" refers to a mechanism for automatic delivery of data to, for example, a server or other device, in response to a designated event occurring in a software system. The event-triggered function allows for the real-time receipt of data in response to the occurrence of the designated event. An event-triggered function can be configured to cause delivery of the data each time the designated event occurs or to cause delivery of the data at designated intervals or times (e.g., every 5 minutes). The creation of an event-triggered function includes specification of a uniform resource locator (URL) and subscribing to events. When the event that the event-triggered function is subscribed to occurs, the application will send an HTTP request with data about the event to the specified URL. If a server (e.g., a server on which the software development planning platform 120 is running) is configured to listen for event-triggered function deliveries at that URL, the server will perform one or more actions (e.g., trigger the processing and loading of the data to the database 130). An example of an event-triggered function is a webhook.

In illustrative embodiments, the data from the software development project platform 105 added to the database 130 is used as training data for the machine learning models of the first machine learning engine 140 and the second machine learning engine 150. The training data comprises, for example, historical data about one or more software development projects managed via the software development project platform 105 and/or real-time data about one or more active software development projects managed via the software development project platform 105. For example, the real-time data comprises one or more active workloads of one or more developers for the one or more active software development projects.

Referring to steps 204 and 205 of the operational flow 200 and to the information processing system 100 in FIG. 1, the training data is processed by the pre-processing layers 141 and 151 of the first machine learning engine 140 and the second machine learning engine 150. The processed training data is input to the training and prediction layers 142 and 152 of the first machine learning engine 140 and the second machine learning engine 150 to train and develop the first and second machine learning models.

In more detail, in connection with pre-processing, FIGS. 5A and 5B depict example pseudocode 501 and 502 for importation of libraries used in connection with the first and second machine learning models. The libraries include, for example, TensorFlow, ScikitLearn, Pandas and other libraries. FIG. 6 illustrates pseudocode 600 for loading a software development project platform ticket dataset into a data frame for building the training data. The data may be in the form of a CSV file. FIG. 7 depicts example pseudocode 700 for data formatting for training data and FIG. 8 depicts pseudocode 800 for column feature selection for the training used to train the first and second machine learning models.

FIG. 9 depicts example pseudocode 900 for label encoding the data and FIGS. 10A and 10B depict example pseudocode 1001 and 1002 for removing certain features from text data prior to inputting the data to the first and second machine learning models for training and further processing. Since machine learning works with vectors (e.g., numbers), categorical and textual attributes must be encoded before being used as training data. In one or more embodiments, this can be achieved by leveraging a LabelEncoder function of ScikitLearn library. The pseudocode 1001 and 1002 specifies cleaning the data to remove special characters, emoticons, emojis and extra spaces. FIG. 11 depicts example pseudocode 1100 for lemmatization of the data prior to inputting the data to the first and second machine learning models for training and further processing.

In connection with training and developing the first machine learning model, which in illustrative embodiments, is a recurrent neural network (RNN) model, the pre-processing layer 141 transforms text data into numerical vectors (vectorizing) and sequences the transformed text data to generate data to be inputted to the first machine learning model. In more detail, FIG. 12 depicts example pseudocode 1200 for performing join and sort functions on the text data, and FIG. 13 depicts example pseudocode 1300 for vectorizing the text data. In connection with the vectorizing, FIG. 14 depicts example pseudocode 1400 for converting tokens to character identifiers.

FIG. 15 depicts example pseudocode 1500 for using Tensorflow text to split strings by character, and FIG. 16 depicts example pseudocode 1600 for conversion of individual characters to sequences of desired size. A batch method is used for the conversion. FIG. 17 depicts example pseudocode 1700 for a function which duplicates and shifts an input sequence. In more detail, for training, a dataset of (input, label) pairs is needed, where "input" and "label" are sequences. At each time step, the "input" is the current character, and the "label" is the next character. The function in the pseudocode 1700 takes a sequence as input, duplicates and shifts the sequence to align the input and label for each time step.

FIG. 18 depicts example pseudocode 1800 for creating batches of training data. In more detail, "tf.data" is used to split the text into manageable sequences. Prior to feeding this data into the first machine learning model, the data is shuffled and packaged into batches.

FIG. 19 depicts example pseudocode 1900 for building an RNN machine learning model to be used as the first machine learning model. The pseudocode 1900 specifies, for example, a length of the vocabulary in the string lookup layer, an embedding dimension, and a number of RNN units. Word embeddings provide a way to represent words as vectors by providing similar vector representations for words with similar meanings. In connection with training the first machine learning model, FIG. 20 depicts example pseudocode 2000 for attaching an optimizer and a loss function to the first machine learning model. In more detail, the training and prediction layer 142 uses a "sparse_categorical_crossentropy" loss function applied across the last dimension of the predictions. Because the model returns logits, a "from_logits" flag is set as "true." FIG. 21 depicts example pseudocode 2100 for saving checkpoints during training of the first machine learning model. For example, a "tf.keras.callbacks.ModelCheckpoint" designation is used to ensure that checkpoints are saved during training. The pseudocode 2100 specifies a directory where the checkpoints will be saved and a name of the checkpoint files.

FIG. 22 depicts example pseudocode 2200 for defining a number of epochs for training the first machine learning model. In this case, which is a non-limiting illustrative example, the pseudocode 2200 specifies 10 epochs to train the model. In Google® Colab®, the runtime is set to use a graphics processing unit (GPU) for faster training. FIG. 23 depicts example pseudocode 2300 for saving the trained first machine learning model.

FIGS. 24A, 24B and 24C depict example pseudocode 2401, 2402 and 2403 for the training and prediction layer 142 to execute the first machine learning model to generate one or more descriptions of a software development project based at least in part on inputted data processed by the pre-processing layer 141. The first machine learning model undergoes training to become proficient in generating a plurality of descriptions (e.g., stories) based on inputted features.

In connection with training and developing the second machine learning model, which in illustrative embodiments, is a long short-term memory (LSTM) model, the pre-processing layer 151 tokenizes text data and applies sequence padding to the tokenized text data to generate data to be inputted to the second machine learning model. In more detail, FIG. 25 depicts example pseudocode 2500 for label encoding, and FIG. 26 depicts example pseudocode 2600 for tokenization, including removal of punctuation, non-alphanumeric characters, stop words and performing lemmatization. FIG. 27 depicts example pseudocode 2700 for generating the padded sequences. FIGS. 28A and 28B depict example pseudocode 2801 and 2802 for performing word embedding. As noted herein above, word embeddings provide a way to represent words as vectors by providing similar vector representations for words with similar meanings. According to illustrative embodiments, the word embedding can be performed using a FastText word embedding technique.

FIG. 29 depicts example pseudocode 2900 for building an LSTM machine learning model to be used as the second machine learning model. An LSTM model is a type of RNN. The LSTM model can include an input layer taking a sequence of words as input. An LSTM layer computes an output using LSTM units. For example, 100 units are added in the layer, but this number can be tuned for accuracy. A dropout layer is a regularization layer which randomly deactivates some neurons in the LSTM layer to prevent over-fitting. This layer is optional. An output layer computes the probability of the best possible next word as output. As can be seen in the pseudocode 2900, rectified linear unit (ReLu) and Sigmoid activation functions are used. In addition, illustrative embodiments use "binary_crossentropy" as a loss function, adam (adaptive moment estimation) as an optimization algorithm, and "accuracy" as a metrics value.

FIGS. 30A and 30B depict example pseudocode 3001 and 3002 for running epochs in connection with training the second machine learning model. In this case, which is a non-limiting illustrative example, the pseudocode 3001 and 3002 specifies 20 epochs to train the model. As can be seen, loss and accuracy values are computed for each epoch.

Figure 31B:
FIG. 31B depicts a plot of training accuracy and validation accuracy based on testing and evaluating a machine learning model according to an illustrative embodiment.

FIG. 31A depicts example pseudocode 3101 for testing and evaluating the second machine learning model. For example, the pseudocode 3101 requires outputting of precision, recall, F1-score and support values. Recall refers to the ability of a classification model to identify all data points in a relevant class. Precision refers to the ability of a classification model to return only the data points in a class. F1-score is a measure of the harmonic mean of precision and recall. F1-score integrates precision and recall into a single metric to gain a better understanding of model performance. FIG. 31B depicts a plot 3102 of training accuracy and validation accuracy based on testing and evaluating the second machine learning model. FIG. 32 depicts example pseudocode 3200 for saving the trained second machine learning model. The second machine learning model tokenizes text data and applies sequence padding to ensure uniform input length. The second machine learning model undergoes training to become proficient in generating assignments to developers to perform one or more tasks for a software development project based on inputted features. In illustrative embodiments, the inputted features to the second machine learning model are based at least in part on the output of the first machine learning model (e.g., the generated descriptions from the first machine learning model).

Referring back to the operational flow 200 in FIG. 2, a determination is made at step 206 regarding the accuracy of each model, or whether further training is required. In more detail, the accuracy determination engine 160 computes accuracies of the first machine learning model and the second machine learning model and compares the computed accuracies to a threshold. As seen, for example, in the pseudocode 3001, 3002 and 3101, the accuracy of the second machine learning model is computed. If the accuracy of a model meets or exceeds a threshold accuracy value (e.g., 90%) (YES at step 206), then the microservice and application deployment engine 170 deploys the machine learning model in a machine learning (ML) application as a microservice (step 207), and the ML application is made available to users (step 209) so that users can input the features for a software deployment project for analysis and prediction by the machine learning model. The ML application includes functionality to call the microservices corresponding the first and second machine learning models. If the accuracy of a model does not meet or exceed a threshold accuracy value (NO at step 206), then the machine learning model is not deployed in an ML application (step 208) and further training needs to be performed to increase the accuracy before deployment can occur.

In other words, upon the successful completion of training for each machine learning models, the first and second machine learning models are deployed as microservices, rendering them callable entities within a system. The decision to deploy the models hinges on their accuracy following training. In a non-limiting illustrative example, a threshold is established requiring that the machine learning models only undergo deployment if their accuracy exceeds 90%.

Figure 3:
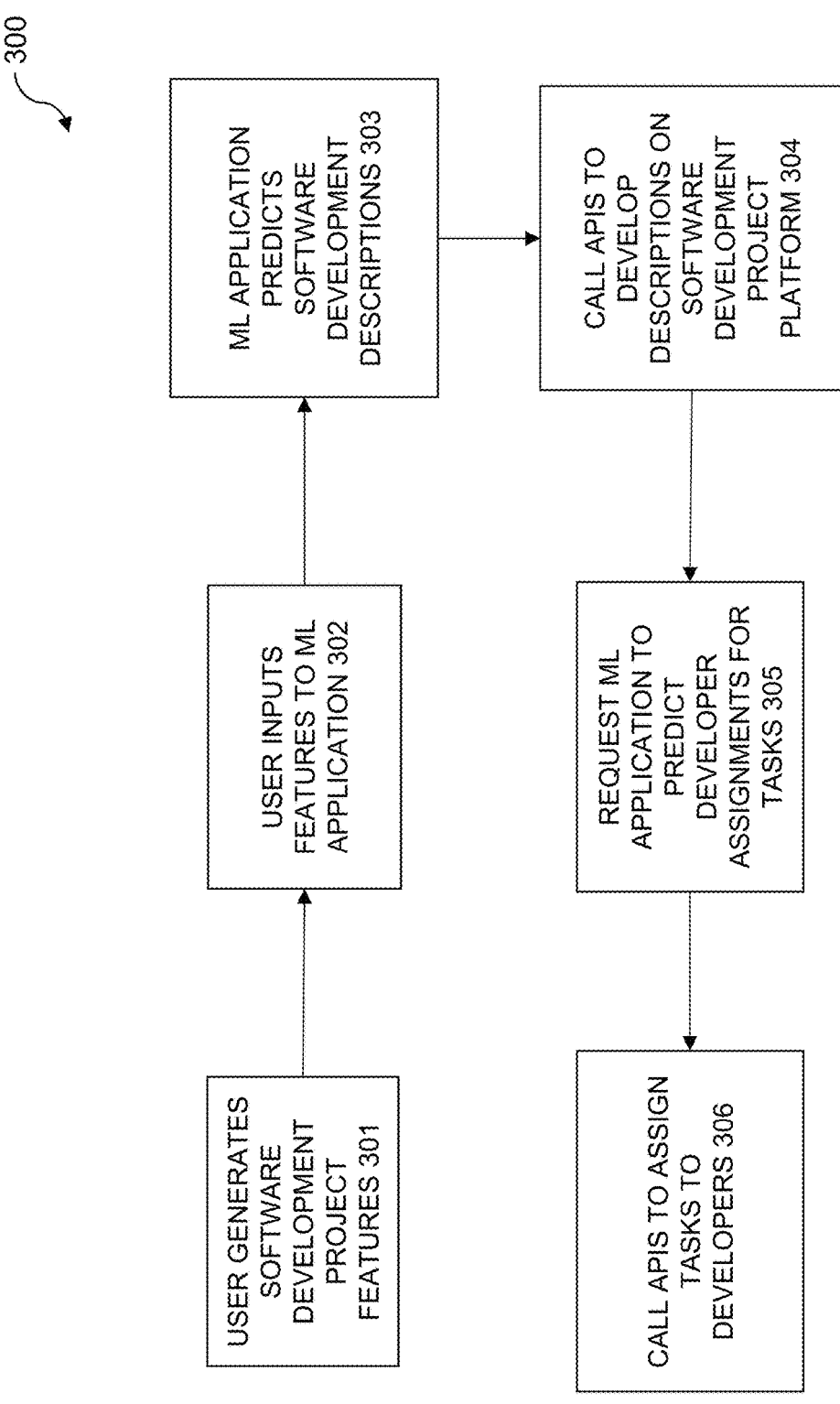
FIG. 3 depicts an operational flow for software development management according to an illustrative embodiment.

Referring to the operational flow 300 in FIG. 3, when a user (e.g., a product owner) is tasked with initiating a software development project, the user generates a textual input including various features of a software development project (step 301). The features include, for example, requirements of the software development project and can specify, for example, programming language, code and business objectives, timeline, budget, available hardware, system resource allocation, service level agreements (SLAs), security requirements, risk requirements, compliance requirements, access requirements, network requirements, number of users, service providers, etc. In some embodiments, a user can initiate the development phase by crafting placeholders using software development project platform ticketing tools.

Referring to step 302, the user inputs the textual input to the deployed ML application noted in connection with FIG. 2. Referring to step 303, the ML application uses the first machine learning model, which has been deployed as a microservice, to process the textual input as described herein above and, with its advanced predictive algorithms (e.g., RNN model), predicts and generates a plurality of descriptions (e.g., stories) of a software development project based on the inputted features. In illustrative embodiments, the plurality of descriptions comprises a ranked list of recommended stories that align with the inputted objectives of the software development project.

The plurality of descriptions are sent to the software development project platform 105 to enable creation of the software development project in the software development project platform. In more detail, referring to step 304, one or more APIs of the software development project platform 105 are called to develop the predicted plurality of descriptions of the software development project on the software development project platform 105. For example, one or more APIs of the software development project platform 105 are called to enable creation of the software development project on the software development project platform 105 based on the predicted plurality of descriptions. The creation of the software development project on the software development project platform 105 includes, for example, developing the predicted plurality of descriptions into stories on the software development project platform 105.

Referring to step 305, data from the developed stories or other elements of the created software development project from the software development project platform 105 is input to the second machine learning model through the deployed ML application. The second machine learning model generates and predicts one or more assignments to one or more developers to perform one or more tasks for the software development project based on the inputted data. The inputted data can include, for example, identifiers, goals, tasks, workloads, functions, work types or other details of the software development project that may have been created by software development project platform 105 based on the predicted plurality of descriptions from the first machine learning model.

The one or more assignments are sent to the software development project platform 105 to enable implementation of the one or more assignments. In more detail, referring to step 306, one or more APIs of the software development project platform 105 are called to implement the task assignments on the software development project platform 105, which can include, for example, adding the developers to specific tasks for a software development project on the software development project platform 105, creating placeholders on the software development project platform 105 including details designating the developers for specific tasks and/or notifying the developers through the respective developer devices 102 of their task assignments.

Figure 4:
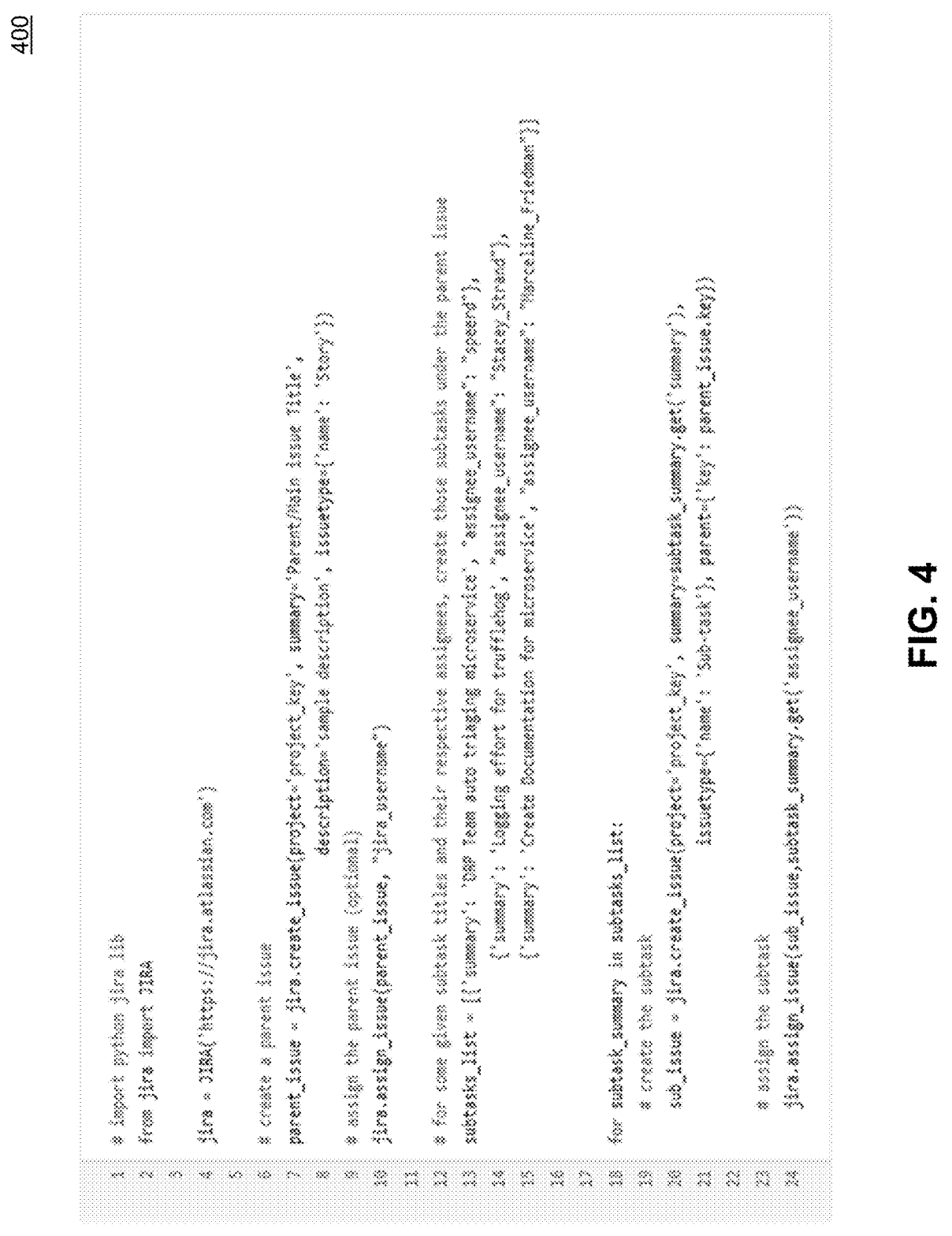

The operational flow 300 outlines a streamlined and efficient workflow in which a user (e.g., product owner) harnesses the capabilities of the first and second machine learning models through the deployed ML application to facilitate the creation of software development project-specific stories and the assignment of tasks outlined in these stories to the most suitable team members. In connection with the operational flow 300, FIG. 4 depicts example pseudocode 400 for creating software development project platform issues, tasks and assignments. In this case the software development project platform is Jira®.

In connection with execution of the first and second machine learning models and their accessibility through the deployed ML application, FIGS. 33A and 33B depict example pseudocode 3301 and 3302 for setting up preferred installer program (pip) modules for implementation of the first and second machine learning models. FIG. 34 depicts example pseudocode 3400 for loading data for the first and second machine learning models. FIGS. 35A, 35B and 35C depict example pseudocode 3501, 3502 and 3503 for loading the trained first machine learning model for generating the plurality of descriptions. FIG. 36 depicts example pseudocode 3600 for generating a predicted software development description from the first machine learning model according to an illustrative embodiment. FIGS. 37A, 37B and 37C depict example pseudocode 3701, 3702 and 3703 for generating predicted developer assignments for a software development workflow from the second machine learning model based on developed stories as described herein above.

In some embodiments, the database 130 and other data corpuses, repositories or databases referred to herein are implemented using one or more storage systems or devices associated with the software development planning platform 120. In some embodiments, one or more of the storage systems utilized to implement the database 130 and other data corpuses, repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the software development planning platform 120, the database 130, first machine learning engine 140, second machine learning engine 150, accuracy determination engine 160 and/or microservice and application deployment engine 170 in other embodiments can be implemented at least in part externally to the software development planning platform 120, for example, as stand-alone servers, sets of servers or other types of systems coupled to the network. For example, the database 130, first machine learning engine 140, second machine learning engine 150, accuracy determination engine 160 and/or microservice and application deployment engine 170 may be provided as cloud services accessible by the software development planning platform 120.

The database 130, first machine learning engine 140, second machine learning engine 150, accuracy determination engine 160 and/or microservice and application deployment engine 170 in the FIG. 1 embodiment are each assumed to be implemented using at least one processing device. Each such processing device generally comprises at least one processor and an associated memory, and implements one or more functional modules for controlling certain features of the database 130, first machine learning engine 140, second machine learning engine 150, accuracy determination engine 160 and/or microservice and application deployment engine 170.

At least portions of the software development planning platform 120 and the elements thereof may be implemented at least in part in the form of software that is stored in memory and executed by a processor. The software development planning platform 120 and the elements thereof comprise further hardware and software required for running the software development planning platform 120, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the database 130, first machine learning engine 140, second machine learning engine 150, accuracy determination engine 160, microservice and application deployment engine 170 and other elements of the software development planning platform 120 in the present embodiment are shown as part of the software development planning platform 120, at least a portion of the database 130, first machine learning engine 140, second machine learning engine 150, accuracy determination engine 160, microservice and application deployment engine 170 and other elements of the software development planning platform 120 in other embodiments may be implemented on one or more other processing platforms that are accessible to the software development planning platform 120 over one or more networks. Such elements can each be implemented at least in part within another system element or at least in part utilizing one or more stand-alone elements coupled to the network.

It is assumed that the software development planning platform 120 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or LXCs, or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the database 130, first machine learning engine 140, second machine learning engine 150, accuracy determination engine 160, microservice and application deployment engine 170 and other elements of the software development planning platform 120, and the elements thereof can each be implemented in the form of one or more LXCs running on one or more VMs. Other arrangements of one or more processing devices of a processing platform can be used to implement the database 130, first machine learning engine 140, second machine learning engine 150, accuracy determination engine 160 and microservice and application deployment engine 170, as well as other elements of the software development planning platform 120. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the software development planning platform 120 to reside in different data centers. Numerous other distributed implementations of the software development planning platform 120 are possible.

Accordingly, one or each of the database 130, first machine learning engine 140, second machine learning engine 150, accuracy determination engine 160, microservice and application deployment engine 170 and other elements of the software development planning platform 120 can each be implemented in a distributed manner so as to comprise a plurality of distributed elements implemented on respective ones of a plurality of compute nodes of the software development planning platform 120.

It is to be appreciated that these and other features of illustrative embodiments are presented by way of example only, and should not be construed as limiting in any way. Accordingly, different numbers, types and arrangements of system elements such as the database 130, first machine learning engine 140, second machine learning engine 150, accuracy determination engine 160, microservice and application deployment engine 170 and other elements of the software development planning platform 120, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the software development planning platform can be offered to cloud infrastructure customers or other users as part of FaaS, CaaS and/or PaaS offerings.

The operation of the information processing system 100 will now be described in further detail with reference to the flow diagram of FIG. 38. With reference to FIG. 38, a process 3800 for software development management as shown includes steps 3802 through 3806, and is suitable for use in the system 100 but is more generally applicable to other types of information processing systems comprising a software development planning platform configured for predicting and generating software development project descriptions (e.g., stories) and workload and/or task assignments to be performed by developers in connection with a software development project.

In step 3802, first data comprising a plurality of features for software development is input to a first machine learning model. The first machine learning model generates one or more descriptions of a software development project based at least in part on the first data. In illustrative embodiments, text data is transformed into numerical vectors and the transformed text data is sequenced to generate the first data to be inputted to the first machine learning model. The first machine learning model may comprise an RNN.

In step 3804, second data based at least in part on the one or more descriptions of the software development project is input to a second machine learning model. The second machine learning model generates one or more assignments to one or more developers to perform one or more tasks for the software development project. In illustrative embodiments, text data is tokenized, and sequence padding is applied to the tokenized text data to generate the second data to be inputted to the second machine learning model. The second machine learning model can comprise an LSTM model.

Step 3806 of the process 3800 comprises causing sending of the one or more assignments to a software development project platform to enable implementation of the one or more assignments. The process may further include causing sending of the one or more descriptions to the software development project platform to enable creation of the software development project on the software development project platform. The second data may be based at least in part on the creation of the software development project.

In illustrative embodiments, at least one of the enabling of the implementation of the one or more assignments and the enabling of the creation of the software development project on the software development project platform comprises calling one or more application programming interfaces of the software development project platform.

In illustrative embodiments, the first machine learning model and the second machine learning model are trained with training data retrieved from the software development project platform. The software development project platform may be monitored to detect one or more events on the software development project platform. The monitoring may comprise integrating an event-triggered function with the software development project platform to detect the one or more events and trigger collection and loading of the training data into at least one database in response to the detecting. The training data may comprise historical data about one or more software development projects managed via the software development project platform and/or real-time data about one or more active software development projects managed via the software development project platform, the real-time data comprising one or more active workloads of the one or more developers for the one or more active software development projects.

In illustrative embodiments, an accuracy of at least one of the first machine learning model and the second machine learning model is computed. A determination is made whether the computed accuracy at least one of meets and exceeds a threshold accuracy. If the computed accuracies of the first and second machine learning models meets or exceeds the threshold accuracy, the first machine learning model and the second machine learning model are deployed as one or more microservices, and at least one application is provided through which the one or more microservices can be called.

It is to be appreciated that the FIG. 38 process and other features and functionality described above can be adapted for use with other types of information systems configured to execute software development planning services in a software development planning platform or other type of platform.

The particular processing operations and other system functionality described in conjunction with the flow diagram of FIG. 38 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 38 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a software development planning platform as disclosed herein can provide a number of significant advantages relative to conventional arrangements. For example, the software development planning platform uses machine learning techniques to generate software project descriptions and assign tasks to developers, greatly reducing the resource consumption and increasing efficiency of software development planning and management with respect to conventional approaches.

As an additional advantage, unlike current techniques, the illustrative embodiments provide a consistent and standardized approach to software development project planning and task creation. As a result, the embodiments reduce the likelihood of errors, discrepancies and/or misunderstandings among team members about the nature and scope of tasks. Advantageously, the machine learning techniques used by the embodiments provide technical solutions incorporating data-driven decision making. The machine models analyze historical and real-time data, performance metrics and resource utilization to make informed task assignments that optimize task distribution and ensure that developers with needed skills are performing appropriate tasks. As an additional advantage over current techniques, the embodiments minimize human error in task creation, assignment, and tracking, leading to less rework, delays and code quality issues.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the software development planning platform 120 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a software development planning platform in illustrative embodiments. These and other cloud-based systems in illustrative embodiments can include object stores.

Illustrative embodiments of processing platforms will now be described in greater detail with reference to FIGS. 39 and 40. Although described in the context of system 100, these platforms may also be used to implement at least portions of other information processing systems in other embodiments.

Figure 39:
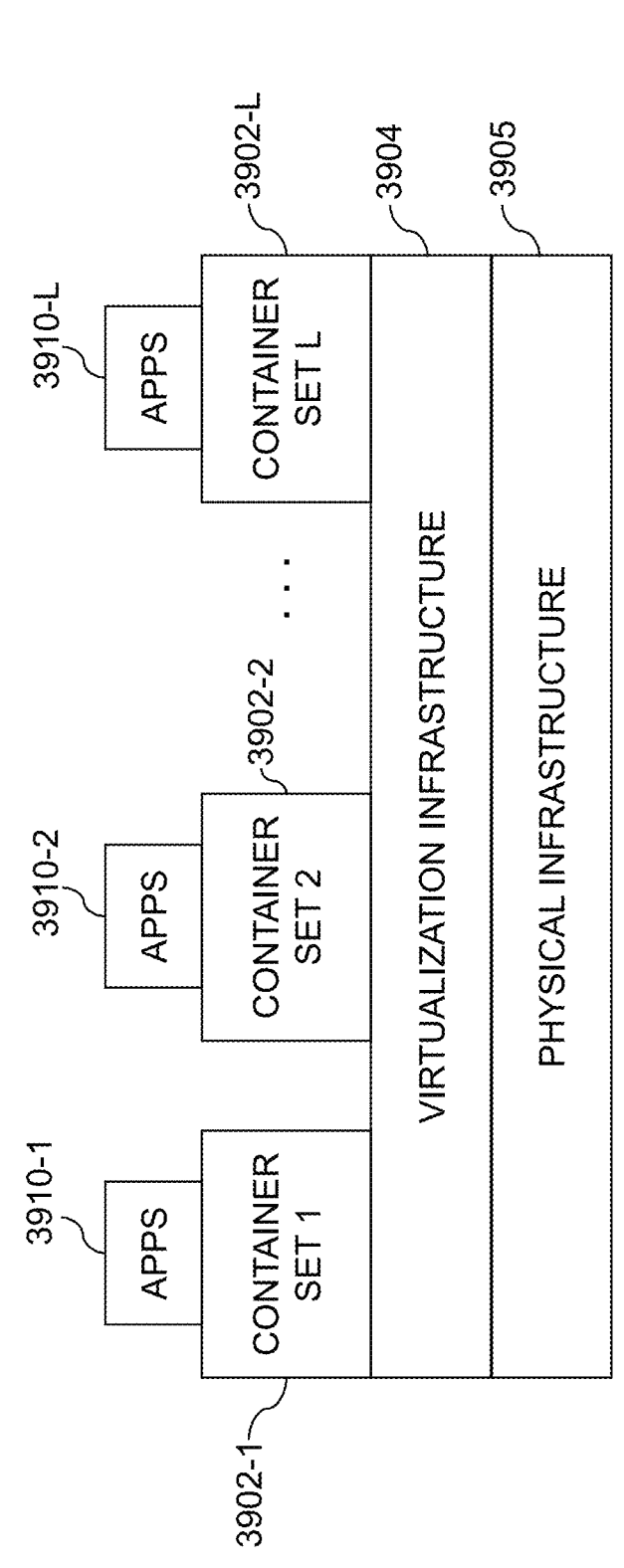
FIGS. 39 and 40 show examples of processing platforms that may be utilized to implement at least a portion of an information processing system according to illustrative embodiments.
Figure 40:
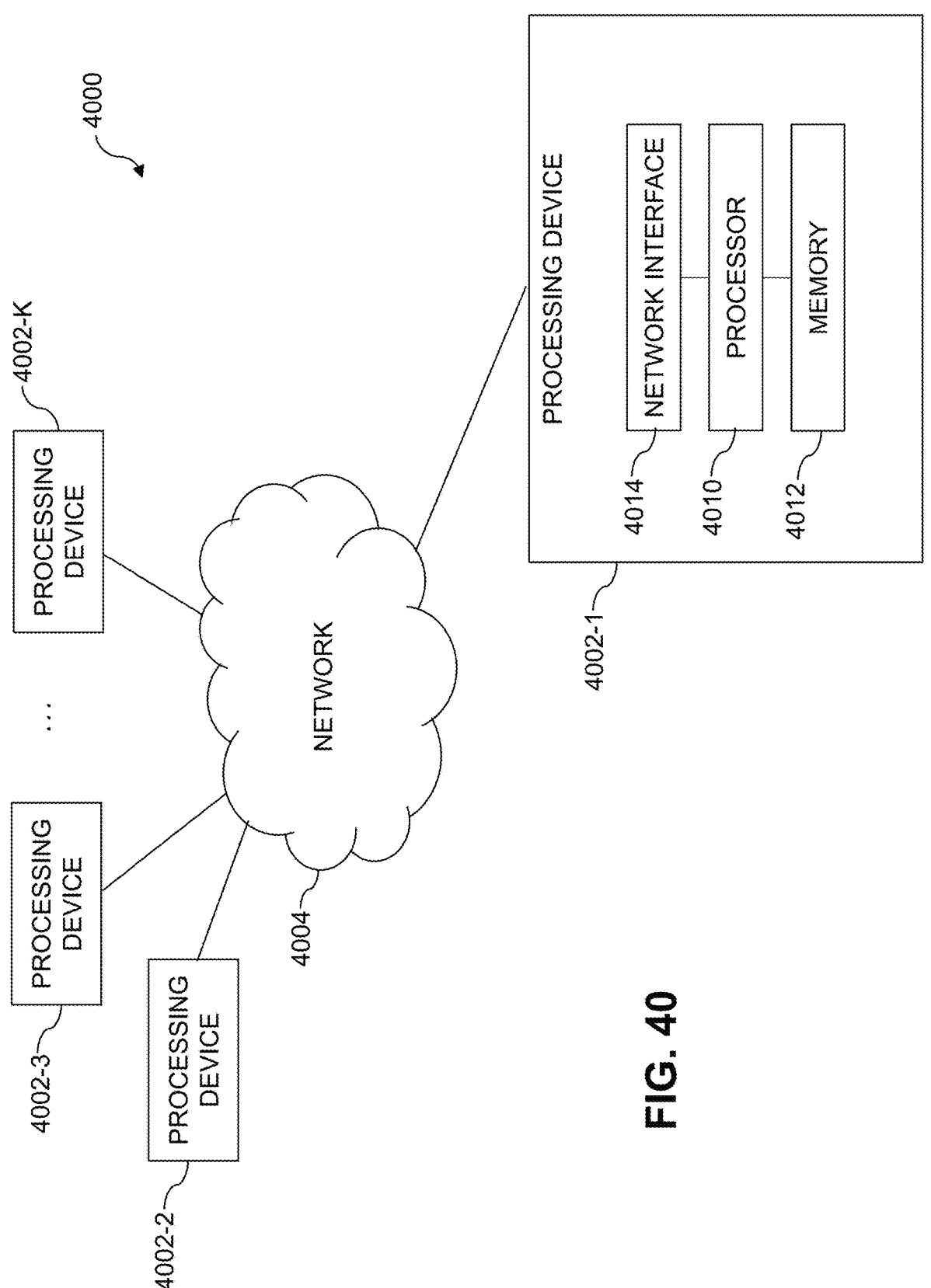

FIG. 39 shows an example processing platform comprising cloud infrastructure 3900. The cloud infrastructure 3900 comprises a combination of physical and virtual processing resources that may be utilized to implement at least a portion of the information processing system 100. The cloud infrastructure 3900 comprises multiple virtual machines (VMs) and/or container sets 3902-1, 3902-2, . . . 3902-L implemented using virtualization infrastructure 3904. The virtualization infrastructure 3904 runs on physical infrastructure 3905, and illustratively comprises one or more hypervisors and/or operating system level virtualization infrastructure. The operating system level virtualization infrastructure illustratively comprises kernel control groups of a Linux operating system or other type of operating system.

The cloud infrastructure 3900 further comprises sets of applications 3910-1, 3910-2, . . . 3910-L running on respective ones of the VMs/container sets 3902-1, 3902-2, . . . 3902-L under the control of the virtualization infrastructure 3904. The VMs/container sets 3902 may comprise respective VMs, respective sets of one or more containers, or respective sets of one or more containers running in VMs.

In some implementations of the FIG. 39 embodiment, the VMs/container sets 3902 comprise respective VMs implemented using virtualization infrastructure 3904 that comprises at least one hypervisor. A hypervisor platform may be used to implement a hypervisor within the virtualization infrastructure 3904, where the hypervisor platform has an associated virtual infrastructure management system. The underlying physical machines may comprise one or more distributed processing platforms that include one or more storage systems.

In other implementations of the FIG. 39 embodiment, the VMs/container sets 3902 comprise respective containers implemented using virtualization infrastructure 3904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 3900 shown in FIG. 39 may represent at least a portion of one processing platform. Another example of such a processing platform is processing platform 4000 shown in FIG. 40.

The processing platform 4000 in this embodiment comprises a portion of system 100 and includes a plurality of processing devices, denoted 4002-1, 4002-2, 4002-3, . . . 4002-K, which communicate with one another over a network 4004.

The network 4004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 4002-1 in the processing platform 4000 comprises a processor 4010 coupled to a memory 4012. The processor 4010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 4012 may comprise random access memory (RAM), read-only memory (ROM), flash memory or other types of memory, in any combination. The memory 4012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 4002-1 is network interface circuitry 4014, which is used to interface the processing device with the network 4004 and other system components, and may comprise conventional transceivers.

The other processing devices 4002 of the processing platform 4000 are assumed to be configured in a manner similar to that shown for processing device 4002-1 in the figure.

Again, the particular processing platform 4000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the software development planning platform 120 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and software development planning platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
inputting first data comprising a plurality of features for software development to a first machine learning model, wherein the first machine learning model generates one or more descriptions of a software development project based at least in part on the first data;
inputting second data based at least in part on the one or more descriptions of the software development project to a second machine learning model, wherein the second machine learning model generates one or more assignments to one or more developers to perform one or more tasks for the software development project; and
causing sending of the one or more assignments to a software development project platform to enable implementation of the one or more assignments;
wherein the steps of the method are executed by a processing device operatively coupled to a memory.

2. The method of claim 1 further comprising causing sending of the one or more descriptions to the software development project platform to enable creation of the software development project on the software development project platform.

3. The method of claim 2 wherein the second data is based at least in part on the creation of the software development project.

4. The method of claim 2 wherein at least one of the enabling of the implementation of the one or more assignments and the enabling of the creation of the software development project on the software development project platform comprises calling one or more application programming interfaces of the software development project platform.

5. The method of claim 1 further comprising training the first machine learning model and the second machine learning model with training data retrieved from the software development project platform.

6. The method of claim 5 further comprising monitoring the software development project platform to detect one or more events on the software development project platform.

7. The method of claim 6 wherein the monitoring comprises integrating an event-triggered function with the software development project platform to detect the one or more events and trigger collection and loading of the training data into at least one database in response to the detecting.

8. The method of claim 5 wherein the training data comprises historical data about one or more software development projects managed via the software development project platform.

9. The method of claim 5 wherein the training data comprises real-time data about one or more active software development projects managed via the software development project platform, the real-time data comprising one or more active workloads of the one or more developers for the one or more active software development projects.

10. The method of claim 1 further comprising transforming text data into numerical vectors and sequencing the transformed text data to generate the first data to be inputted to the first machine learning model.

11. The method of claim 1 wherein the first machine learning model comprises a recurrent neural network.

12. The method of claim 1 further comprising tokenizing text data and applying sequence padding to the tokenized text data to generate the second data to be inputted to the second machine learning model.

13. The method of claim 1 wherein the second machine learning model comprises a long short-term memory model.

14. The method of claim 1 further comprising:

computing an accuracy of at least one of the first machine learning model and the second machine learning model; and determining whether the computed accuracy at least one of meets and exceeds a threshold accuracy.

15. The method of claim 1 further comprising:

deploying the first machine learning model and the second machine learning model as one or more microservices; and providing at least one application through which the one or more microservices can be called.

16. An apparatus comprising:

a processing device operatively coupled to a memory and configured:

to input first data comprising a plurality of features for software development to a first machine learning model, wherein the first machine learning model generates one or more descriptions of a software development project based at least in part on the first data;

to input second data based at least in part on the one or more descriptions of the software development project to a second machine learning model, wherein the second machine learning model generates one or more assignments to one or more developers to perform one or more tasks for the software development project; and to cause sending of the one or more assignments to a software development project platform to enable implementation of the one or more assignments.

17. The apparatus of claim 16 wherein the processing device is further configured to train the first machine learning model and the second machine learning model with training data retrieved from the software development project platform.

18. The apparatus of claim 16 wherein the processing device is further configured:

to deploy the first machine learning model and the second machine learning model as one or more microservices; and to provide at least one application through which the one or more microservices can be called.

19. An article of manufacture comprising a non-transitory processor-readable storage medium having stored therein program code of one or more software programs, wherein the program code when executed by at least one processing device causes said at least one processing device to perform the steps of:

inputting first data comprising a plurality of features for software development to a first machine learning model, wherein the first machine learning model generates one or more descriptions of a software development project based at least in part on the first data;

inputting second data based at least in part on the one or more descriptions of the software development project to a second machine learning model, wherein the second machine learning model generates one or more assignments to one or more developers to perform one or more tasks for the software development project; and causing sending the one or more assignments to a software development project platform to enable implementation of the one or more assignments.

20. The article of manufacture of claim 19 wherein the program code further causes said at least one processing device to perform the steps of:

deploying the first machine learning model and the second machine learning model as one or more microservices; and providing at least one application through which the one or more microservices can be called.

* * * * *